(12) United States Patent
Katic

(10) Patent No.: US 10,133,710 B2
(45) Date of Patent: Nov. 20, 2018

(54) GENERATING PREVIEW DATA FOR ONLINE CONTENT

(71) Applicant: FACEBOOK, INC., Menlo Park, CA (US)

(72) Inventor: Vojin Katic, Menlo Park, CA (US)

(73) Assignee: FACEBOOK, INC., Menlo Park, CA (US)

( * ) Notice: Subject to any disclaimer, the term of this patent is extended or adjusted under 35 U.S.C. 154(b) by 244 days.

(21) Appl. No.: 14/174,676

(22) Filed: Feb. 6, 2014

(65) Prior Publication Data

US 2015/0220500 A1 Aug. 6, 2015

Related U.S. Application Data

(63) Continuation of application No. 14/174,627, filed on Feb. 6, 2014.

(51) Int. Cl.
 *G06F 17/22* (2006.01)
 *G06F 17/21* (2006.01)
 *G06F 17/30* (2006.01)

(52) U.S. Cl.
 CPC ........ *G06F 17/2235* (2013.01); *G06F 17/212* (2013.01); *G06F 17/227* (2013.01); *G06F 17/2247* (2013.01); *G06F 17/30899* (2013.01)

(58) Field of Classification Search
 CPC ............... G06F 17/212; G06F 17/2235; G06F 17/30899; G06F 3/04817; G06F 17/227; G06F 17/2247
 See application file for complete search history.

(56) References Cited

U.S. PATENT DOCUMENTS

| | | | |
|---|---|---|---|
| 5,978,842 A | 11/1999 | Noble et al. | |
| 6,011,537 A | 1/2000 | Slotznick | |
| 6,055,570 A | 4/2000 | Nielsen | |
| 6,895,551 B1 | 5/2005 | Huang et al. | |
| 7,433,895 B2 * | 10/2008 | Li | G06F 17/30864 |
| 7,478,054 B1 | 1/2009 | Adams et al. | |

(Continued)

OTHER PUBLICATIONS

Non-Final Office Action for U.S. Appl. No. 14/174,627, dated Nov. 6, 2015, 21 pages.

(Continued)

*Primary Examiner* — Thu Huynh
(74) *Attorney, Agent, or Firm* — Keller Jolley Preece

(57) ABSTRACT

Social networking systems benefit from techniques that improve the ability of users to share online content with other users of a social networking system. In one embodiment, when a user types, pastes, or otherwise inserts a URL, or some other hyperlink, into a message or post to the social networking system, a set of data on the referenced hyperlink target is acquired and stored on a server of the social networking system. The stored data is analyzed, to automatically generate a preview for the hyperlink; and the hyperlink preview is transmitted to the client device for approval. In one embodiment, follow-up actions related to the content are performed when the content is posed, which enables users to perform social graph actions to user nodes and concept nodes related to the message or post. In one embodiment, the shared content is cached on the social networking system.

20 Claims, 13 Drawing Sheets

(56) References Cited

U.S. PATENT DOCUMENTS

| | | | |
|---|---|---|---|
| 7,751,592 B1* | 7/2010 | Rosenberg | G06K 9/6293 382/112 |
| 7,788,258 B1* | 8/2010 | Malpani | G06F 17/30265 707/706 |
| 7,849,093 B2* | 12/2010 | Farago | G06F 17/30029 707/755 |
| 7,873,988 B1 | 1/2011 | Issa et al. | |
| 7,992,171 B2 | 8/2011 | Amidon et al. | |
| 8,054,496 B1 | 11/2011 | Rehfeld | |
| 8,306,326 B2* | 11/2012 | Behm | G06F 17/30707 358/1.15 |
| 8,745,481 B1 | 6/2014 | Ulm | |
| 8,938,500 B1 | 1/2015 | Acharya | |
| 9,152,312 B1 | 10/2015 | Terleski et al. | |
| 9,183,259 B1 | 11/2015 | Marra et al. | |
| 9,183,657 B2 | 11/2015 | Belanger et al. | |
| 9,256,620 B2 | 2/2016 | Amacker et al. | |
| 9,442,903 B2 | 9/2016 | Katic | |
| 9,659,104 B2 | 5/2017 | Soon-Shiong et al. | |
| 9,832,284 B2 | 11/2017 | Katic | |
| 2002/0073058 A1 | 6/2002 | Kremer et al. | |
| 2002/0194434 A1 | 12/2002 | Kurasugi | |
| 2002/0199187 A1 | 12/2002 | Gissin et al. | |
| 2003/0004909 A1 | 1/2003 | Chauhan et al. | |
| 2004/0205514 A1 | 10/2004 | Sommerer et al. | |
| 2005/0198299 A1 | 9/2005 | Beck et al. | |
| 2005/0216300 A1 | 9/2005 | Appelman et al. | |
| 2006/0112092 A1* | 5/2006 | Ziou | G06F 17/30274 |
| 2006/0287916 A1 | 12/2006 | Starr et al. | |
| 2007/0073833 A1 | 3/2007 | Roy et al. | |
| 2007/0078850 A1* | 4/2007 | Aziz | G06Q 30/0603 |
| 2007/0112819 A1 | 5/2007 | Dettinger et al. | |
| 2008/0027928 A1 | 1/2008 | Larson | |
| 2008/0133311 A1 | 6/2008 | Madriz Ottolina | |
| 2008/0154931 A1* | 6/2008 | Jacobs | H04L 67/22 |
| 2009/0034851 A1* | 2/2009 | Fan | G06F 17/30029 382/230 |
| 2009/0099919 A1 | 4/2009 | Schultheiss et al. | |
| 2009/0259723 A1 | 10/2009 | Roic et al. | |
| 2010/0114899 A1* | 5/2010 | Guha | G06F 17/30867 707/741 |
| 2010/0223126 A1* | 9/2010 | Tung | G06Q 30/02 705/14.49 |
| 2010/0293048 A1 | 11/2010 | Singolda et al. | |
| 2011/0022641 A1 | 1/2011 | Werth et al. | |
| 2011/0078587 A1 | 3/2011 | Guy et al. | |
| 2011/0145698 A1* | 6/2011 | Penov | G06F 17/272 715/235 |
| 2011/0164126 A1* | 7/2011 | Ambor | A61B 1/0005 348/65 |
| 2011/0264641 A1* | 10/2011 | Yang | G06F 17/3028 707/706 |
| 2011/0265011 A1 | 10/2011 | Taylor et al. | |
| 2012/0017179 A1* | 1/2012 | Yoon | H04N 5/445 715/838 |
| 2012/0158494 A1 | 6/2012 | Reis et al. | |
| 2012/0232973 A1 | 9/2012 | Robb et al. | |
| 2012/0242689 A1* | 9/2012 | Miyata | G06F 3/14 345/629 |
| 2012/0269425 A1* | 10/2012 | Marchesotti | G06K 9/036 382/159 |
| 2012/0278338 A1* | 11/2012 | Liao | G06F 17/30991 707/748 |
| 2013/0080900 A1 | 3/2013 | Wilde et al. | |
| 2013/0084912 A1 | 4/2013 | Lindner et al. | |
| 2013/0097625 A1 | 4/2013 | Thorwirth et al. | |
| 2013/0237325 A1 | 9/2013 | Chudley et al. | |
| 2013/0259375 A1* | 10/2013 | Dunlop | G06K 9/00684 382/173 |
| 2013/0262559 A1 | 10/2013 | Neerings et al. | |
| 2013/0268829 A1 | 10/2013 | Lansford et al. | |
| 2014/0059436 A1 | 2/2014 | Swenson et al. | |
| 2014/0075296 A1* | 3/2014 | Schaad | G06F 17/2229 715/243 |
| 2014/0146095 A1* | 5/2014 | Park | G09G 3/3208 345/690 |
| 2014/0258849 A1* | 9/2014 | Chung | G06F 17/212 715/243 |
| 2015/0012811 A1 | 1/2015 | Chan et al. | |
| 2015/0095770 A1* | 4/2015 | Mani | G06F 17/2745 715/254 |
| 2015/0143211 A1 | 5/2015 | Kaufthal et al. | |
| 2015/0220787 A1 | 8/2015 | Folkens et al. | |
| 2015/0331552 A1 | 11/2015 | Young et al. | |
| 2015/0331842 A1* | 11/2015 | Costa | H04L 29/08 715/202 |
| 2015/0332384 A1 | 11/2015 | Garcia | |
| 2015/0350259 A1 | 12/2015 | Garg | |
| 2016/0004711 A1 | 1/2016 | Soon-Shiong et al. | |
| 2016/0286256 A1 | 9/2016 | Shin et al. | |
| 2016/0308805 A1 | 10/2016 | Gao et al. | |
| 2016/0342624 A1 | 11/2016 | Mazur et al. | |
| 2017/0024399 A1 | 1/2017 | Boyle et al. | |

OTHER PUBLICATIONS

Non-Final Office Action for U.S. Appl. No. 14/141,678, dated Aug. 25, 2015, 25 pages.

Non-Final Office Action for U.S. Appl. No. 14/292,579, dated Feb. 26, 216, 14 pages.

Final Office Action for U.S. Appl. No. 14/174,627, dated Apr. 8, 2016, 26 pages.

Final Office Action from U.S. Appl. No. 14/141,678, dated Apr. 22, 2016, 24 pages.

Final Office Action from U.S. Appl. No. 14/141,678, dated Jan. 17, 2017, 24 pages.

Final Office Action from U.S. Appl. No. 14/292,579, dated Oct. 12, 2016, 20 pages.

Non-Final Office Action from U.S. Appl. No. 14/141,678, dated Aug. 11, 2016, 24 pages.

Non-Final Office Action from U.S. Appl. No. 14/141,678, dated Jun. 8, 2017, 22 pages.

Non-Final Office Action from U.S. Appl. No. 14/292,579, dated Dec. 27, 2016, 14 pages.

Non-Final Office Action from U.S. Appl. No. 14/292,579, dated Jul. 14, 2017, 16 pages.

Notice of Allowance from U.S. Appl. No. 14/174,627, dated Jul. 29, 2016, 12 pages.

U.S. Appl. No. 14/141,678, dated Oct. 2, 2017, Notice of Allowance.

U.S. Appl. No. 14/292,579, dated Aug. 10, 2018, Office Action.

* cited by examiner

GENERATING PREVIEW DATA FOR ONLINE CONTENT

REFERENCE TO RELATED APPLICATION

This application is a continuation of U.S. application Ser. No. 14/174,627 entitled "Generating Preview Data for Online Content," filed Feb. 6, 2014.

FIELD

Embodiments described herein relate to automatically generating preview data for online content.

BACKGROUND

In recent years, a wide variety of common human interactions and activities have moved online, and in particular, into the realm of social networks. Online social networking sites have been increasingly used to keep up with close social ties, organize around a shared interest, or to meet new people. A December 2012 survey by the Pew Internet & American Life Project found that 67% of American online adults use social networking sites, up dramatically from 8% found by the same organization in a February 2005 survey.

Online social networking sites also provide a convenient way for users to share online media with other users. According to the Pew Project, as of August 2012, 46% of adult Internet users post original photos or videos online, and 41% of adult Internet users take photos or videos that they have found online and repost. Accordingly, techniques to improve the media sharing experience for users are important to online social networking systems.

BRIEF DESCRIPTION OF THE DRAWINGS

The present description is illustrated by way of example, and not by way of limitation. In the figures of the accompanying drawings, like references indicate similar elements. References to "one embodiment," "an embodiment," or "an example embodiment," indicate that the embodiment described may include a particular feature, structure, or characteristic, but every embodiment may not necessarily include the particular feature, structure, or characteristic. Moreover, such phrases are not necessarily referring to the same embodiment, though the embodiments are not mutually exclusive.

DESCRIPTION OF EMBODIMENTS

Figure 1:
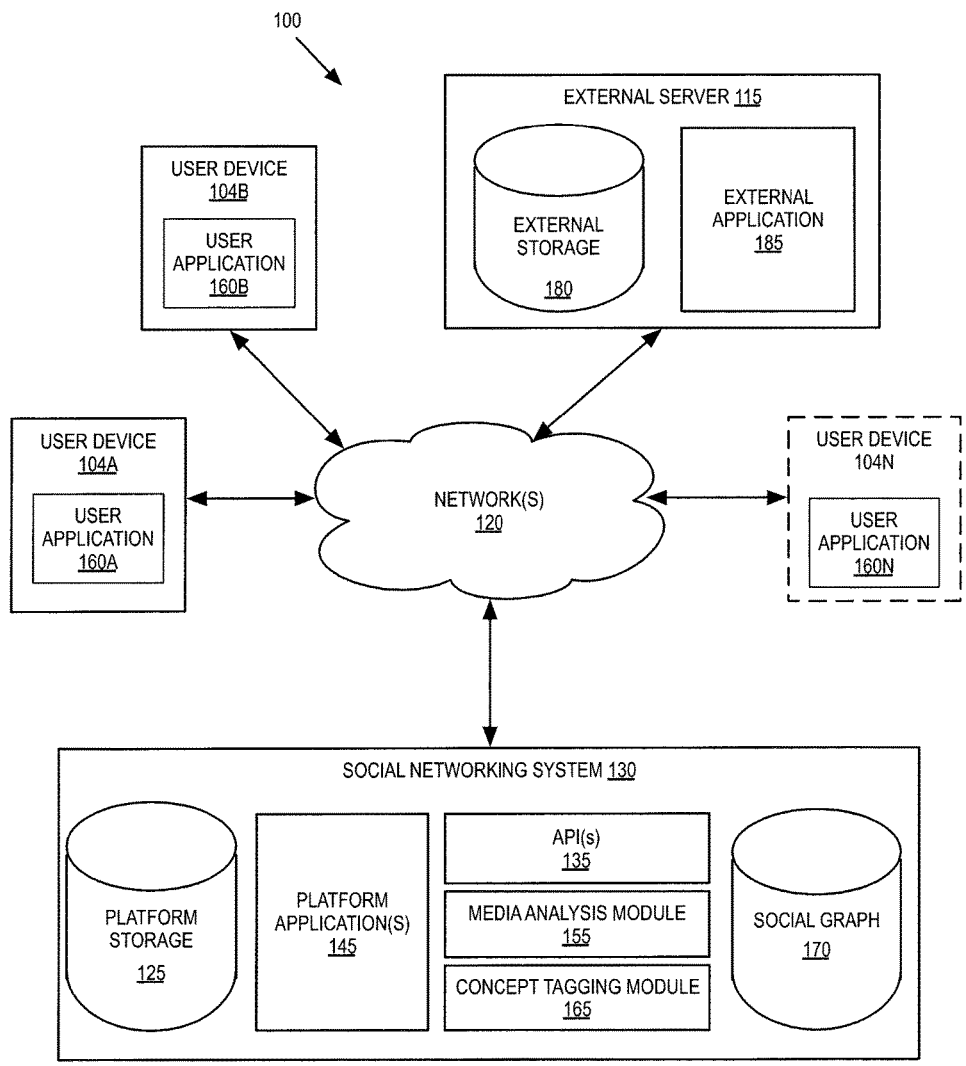
FIG. 1 is an exemplary illustration of an online content hosting and delivery system.

Users of a social networking system share content by sending or posting electronic messages containing hyperlinks, such as a Uniform Resource Locator (URL) to online content. When a user is sent a URL, the underlying content may not be obvious from the URL itself. Additionally, the overall context, or relevance of the content linked via the hyperlink may not be apparent, especially in relation to messages or comments that are made with or in response to the post. Accordingly, a social networking system can benefit from techniques to enable the automatic generation of one or more preview elements for hyperlinks shared between users of the social networking system. While a social networking system is used to describe embodiments of preview generation for online content, it will be understood that these concepts are generally applicable to generating previews for online content for other network services/entities, websites, etc.

Detailed below are embodiments of methods, systems, and user interfaces for generating preview images, titles, and summary data for online content, as well as follow-up actions that are related to the online content. In addition to the embodiments, specific details to enable one skilled in the art to practice the embodiments will be set forth. While such details are set forth, it should be understood that the various embodiments could be practiced without these specific details. Additionally, circuits, structures, and techniques that are generally known in the art are not shown in detail to avoid obscuring the understanding of this description, however, those of ordinary skill in the art, with the included descriptions, will be able to implement appropriate functionality without undue experimentation.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In one embodiment, computational resources of the social networking system execute algorithms to determine an appropriate image, title, and summary to use in an automatically generated preview for the hyperlink. Once the hyperlink preview is generated, the preview elements are transmitted to the client device for approval. The preview is then displayed to describe the content referenced by the hyperlink, and the user can accept or reject the preview. The user can edit one or more portions of the preview, or select an alternate element to display as a preview before submitting the post and the preview for publication.

The computational resources performing the preview generation algorithm select the appropriate preview by considering several data elements, where each data element acts as a sign, indicator, or "signal" to the algorithm. The algorithm uses the signals for the data elements to select the proper data to use for the link preview. Signals to the algorithm include positive and negative signals. Positive signals to the algorithm indicate that a particular image, name, or sentence is relevant or appropriate to use in describing the linked content. Negative signals to the algorithm indicate that a particular image, or other data element, may not be suitable for use as automatically generated preview data.

In one embodiment, follow-up actions are enabled when the content is shared, which allows the use of features of the social networking system by a user that is viewing a post containing the hyperlink to the shared content. For example, the user can comment on the post, re-share the post to friends or followers of the user, or interact with pages on the social networking system related to the shared content. In one embodiment, concepts encompassed within the shared content, such as a product, brand, artist, activity, event, group, etc., are determined by a concept tagging module, and a social graph of the social networking system is updated to associate those concepts with users that interact with the post containing the concept.

The methods, systems, and user interfaces described herein utilize both publicly available information, as well as information provided by users of the social networking system. It should be noted that all use of such information is to be explicitly subject to all privacy settings of the involved users and the privacy policy of the social networking system as a whole.

FIG. 1 illustrates, in block diagram form, an exemplary online content hosting and delivery system. The system includes user devices 104A-104N, a social networking system 130, and an external server 115 coupled to one or more networks 120. A user interacts with the social networking system 130 using a user device (e.g., 104A), such as a desktop computer, laptop computer, tablet computer, personal digital assistant, in-car or out-of-car navigation system, smart phone or other cellular or mobile phone, mobile gaming device, Internet gaming devices, a Web enabled system, a media player, a "thin" client, or another suitable computing device. For example, the user device 104A communicates with the social networking system 130 via an application (e.g., 160A) such as a web browser (e.g., Microsoft Windows Internet Explorer, Mozilla Firefox, Apple Safari, Google Chrome, Opera, etc.) or native application (e.g., Facebook for iPhone or iPad, Facebook for Android, etc.). Each user device 104A-104N can support native or browser based applications (e.g., 160A-160N), which can access the social networking system.

Typical interactions between the user device 104A and the social networking system 130 include receiving publications, operations to view profiles of other users of the social networking system 130, contributing and interacting with media items, joining groups, listing and confirming attendance at events, checking in at locations, liking certain pages/posts, creating pages, and performing other tasks that facilitate social interaction, as described herein. Each interaction is an exemplary interaction of a user accessing the social networking system 130 as a network service.

The social networking system 130 includes one or more severs to perform or provide various operations, tasks and services such as: platform storage 125; one or more application programming interfaces (APIs) 135; perform media analysis 155 and concept tagging 165; maintain a social graph 170; and to provide one or more platform applications 145.

When a post contains a hyperlink, an embodiment of the social networking system 130 stores the content referenced by the hyperlink within platform storage 125 and executes a preview generation algorithm using computational resources of the social networking system 130. The preview generation algorithm interacts with the content stored within the platform storage 125 to extract image and text information from the content that is targeted by the hyperlink. The extracted image and text information is used to generate preview information for the content targeted by the hyperlink.

The media analysis module 155 is used to perform text or image analysis on the extracted image and text information to determine the most relevant image and text data within the content. The relevant data is used to generate previews for the content to display when the content is shared between users of the social networking system. The concept tagging module 165 works with the media analysis module 155 to create or update concept tags stored within concept nodes of the social graph 170. The concept tagging module derives concept tags by analyzing data posted, or otherwise shared by users of the social networking system. The derived concept tags are then used to assist preview generation. The concept tags can be used as preview element candidates, or to refine a set of preview element candidates to automatically generate a preview for hyperlinked content.

The social graph 170 stores user nodes, concept nodes, and edges between nodes as described herein. Each user node comprises one or more data objects corresponding to information associated with or describing a user, while each concept node comprises one or more data objects corresponding to information associated with a concept. Each edge between a pair of nodes comprises one or more data objects corresponding to information associated with a relationship between users (or between a user and a concept, or between concepts) corresponding to the pair of nodes.

Social graph edges for the social graph 170 of the social networking system 130 are more easily updated when users interact with content hosted by the social networking system 130. However, the concepts underlying content on third-party websites may not be as easily determined. Concepts for content hosted on third party websites can be derived during the preview generation process by the media analysis module 155 and concept tagging module 165. Additional discussion on deriving concepts and concept tagging is found in U.S. patent application Ser. No. 13/167,701 titled "Inferring Topics from Social Networking System Communication," and U.S. patent application Ser. No. 13/167,700 titled "Inferring Topics from Social Networking System Communications Using Social Context," which are hereby incorporated by reference.

Third-party web pages may also define specific concepts for hosted content by defining metadata elements for their pages. For example, the external server 115 may host a third-party web page including metadata based on the Open Graph Protocol provided by Facebook, though other manners of metadata tagging are envisioned (e.g., W3C meta tags). Each metadata attribute corresponds to a property (e.g., title, description, etc.) and an associated value. An exemplary set of tags defined under Open Graph is illustrated in Table 1, though the use of metadata tagging is not so limited.

TABLE 1

Exemplary Open Graph Tags.

| Tag | Description |
| --- | --- |
| og:title | The title of the article. |
| og:site_name | The name (not URL) of the host website. |
| og:url | Uniform resource locator for the post. |
| og:description | A description of the content, usually between 2 and 4 sentences. |
| og:image | An image associated with the article/media. |
| fb:app_id | A unique ID for the application or site hosting the content. |
| og:type | The type of media (e.g., website, music, video, article, book, profile). |
| article:author | When the content is an article, the author can be specified. This facilitates the creation of a link to the author's page on the social networking system. |
| article:publisher | When the content is an article, the publisher can be specified. This facilitates the creation of a link to the publisher page on the social networking system. |
| book:author | Author of a book. |
| book:isbn | International Standard Book Number. |

These exemplary tags provide information for use when generating a preview, constructing concept nodes, and linking concept nodes into the social graph. The tags provide signals that allow additional user or concept nodes to be created based on their relationship to the content or concept represented within the target of a shared hyperlink. For example, the og:title tag provides a signal that the title indicated by the tag is an optimal or preferred title for the linked content. Additionally, the og:image tag provides a strong signal as to a proper image to use as a preview image to show for the content. Likewise, at least some of the sentences listed in the og:description tag can be used in the preview summary for the content. Additional description of concept node creation with an exemplary social graph is provided with reference to FIG. 2 below.

Figure 2:
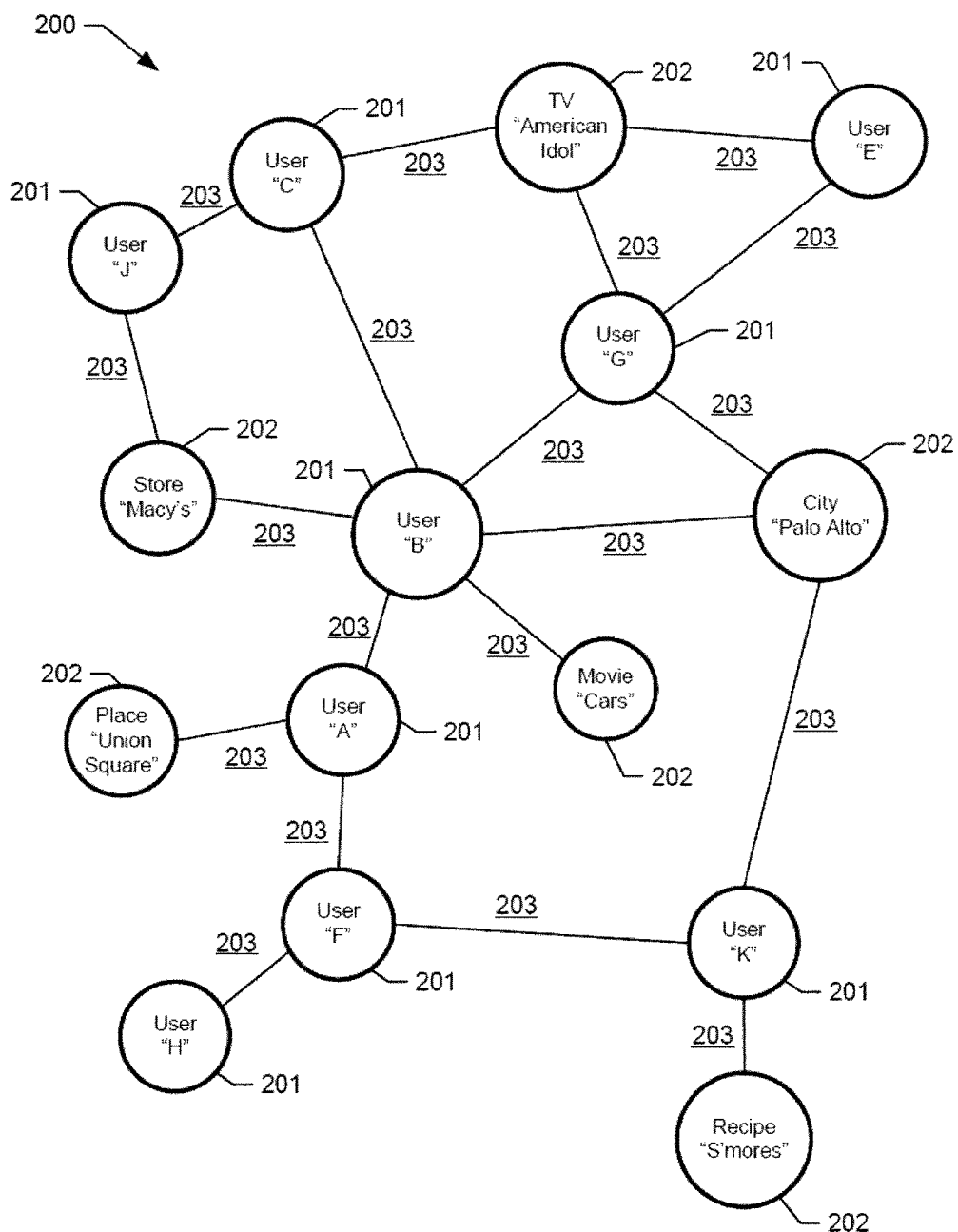
FIG. 2 is an exemplary illustration of a social graph that is used by a social networking system.

FIG. 2 illustrates an exemplary social graph 200 used by a social networking system. The social graph 200 includes user nodes 201, concept nodes 202, and edges 203 between nodes. An edge 203 between a pair of nodes may represent a relationship (or an action) between the pair of nodes. The user may provide his or her name, profile picture, city of residence, contact information, birth date, gender, marital status, family status, employment, educational background, preferences, interests, and other information to be included in the user node 201.

As illustrated, an edge 203 between of a pair of nodes represents a relationship between the pair of nodes. In particular, each edge 203 comprises one or more data objects corresponding to the relationship between a pair of nodes. For example, a first user can declare that a second user is the "friend" of the first user, causing the social networking system to transmit a friend request to the second user. In response to the second user's confirmation of the friend request the social networking system creates an edge between the first user and the second user in the social graph 200, and stores the edge in one or more of storage servers of the social networking system.

The exemplary social graph 200 includes an edge indicating a friend relation between user nodes of user "A" and user "B," and an edge indicating a friend relation between user nodes of user "C" and user "B." Also shown is that user "G" is a friend of user "B", user "C", and user "E", respectively, as illustrated by the edges between user nodes "G" and "B", between user nodes "G" and "C", and between user nodes "G" and "E." Users "C", "E", and "G" watch (or express an affinity for, e.g., "like") a TV show "American Idol", as illustrated by the edges between the "American Idol" concept node and user nodes "C", "E", and G", respectively. Similarly, the edge between the user node "B" and the concept node "Palo Alto" may indicate that user "B" declares "Palo Alto" as his or her city of residence. The edge between the user node "B" and the concept node "Macy's" may indicate that user "B" "likes" the store "Macy's."

Each user node 201 of the social graph 200 may have a corresponding web page (typically known as a profile page). For example, in response to a request including a user name, the social networking system accesses a user node 201 corresponding to the user name and constructs or otherwise displays a profile page including the name, a profile picture, and other information associated with the user. A profile page of a first user may display to a second user all or a portion of the first user's information based on one or more privacy settings by the first user and the relationship between the first user and second user.

In addition, the degree of separation between any two nodes is defined as the minimum number of hops required to traverse the social graph 200 from one node to the other. A degree of separation between two nodes can be considered a measure of relatedness between the users or the concepts represented by the two nodes in the social graph 200. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

Each concept node 202 corresponds to a concept of the social networking system. A concept can represent a real-world entity, such as a movie, a song, a sports team, a celebrity, a group, a restaurant, or other business establishment, or a geographic location. An administrative user of a concept node corresponding to a concept may create or update the concept node by providing information of the concept (e.g., by filling out an online form), causing the social networking system to associate the information with the concept node. For example, information associated with a concept can include a name or a title, one or more images (e.g., an image of a cover page of a book), a web address (e.g., a URL), or contact information (e.g., a phone number, an email address). Each concept node of the social graph may correspond to a web page, including a third-party web page.

It should be noted that the social graphs can be much larger than social graph 200 and the number of edges and/or nodes in a social graph may be many orders of magnitude larger than that depicted herein. Additionally, the social graph 200 can expand and update dynamically based on user activity. In one embodiment, the social graph 200 is dynamically expanded and updated using data gathered from content shared between users of the social networking system. For example, the concept tagging module 165 of FIG. 1 can determine or infer concepts from web pages, videos, or other media shared between users on the social network.

Figure 3:
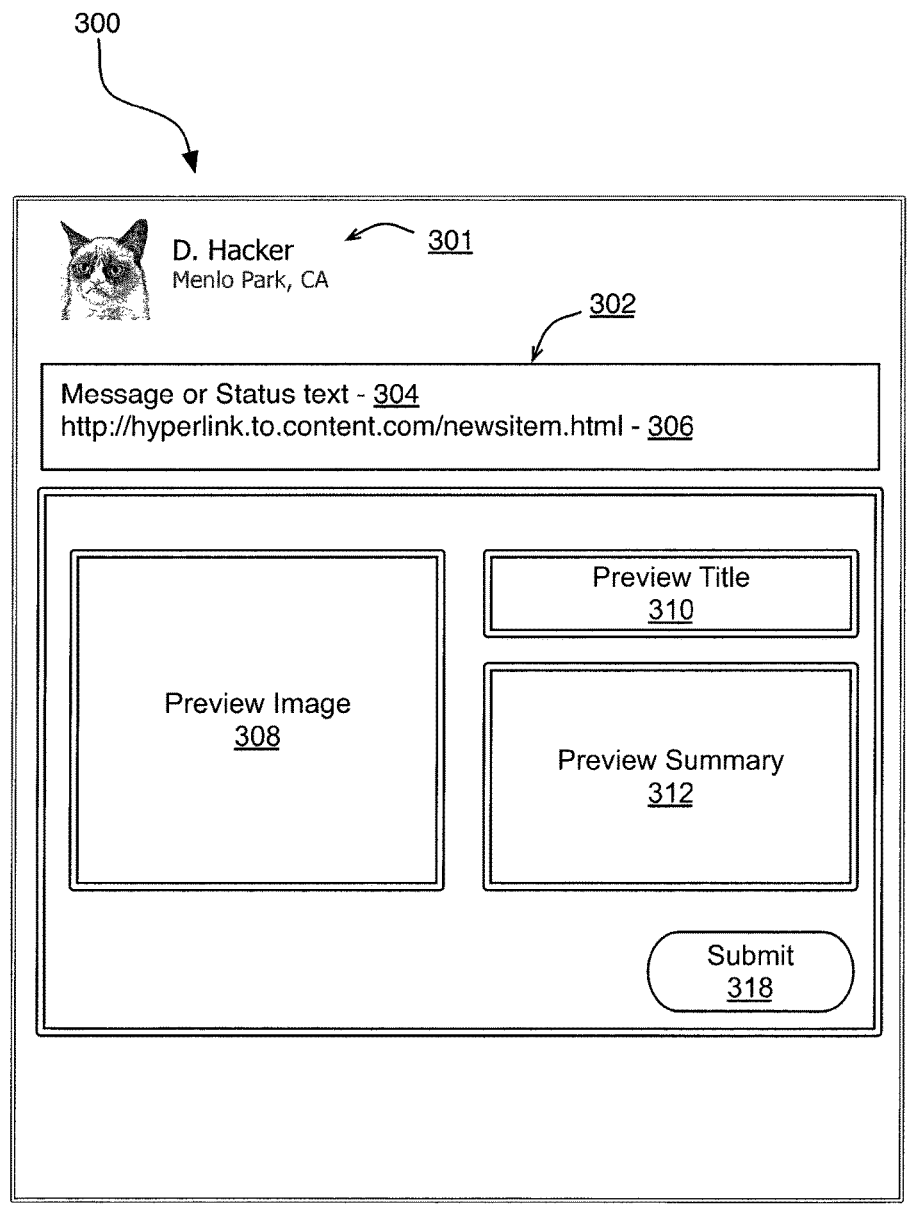
FIG. 3 is an exemplary illustration of a graphical display for a post composition prompt, which includes a preview of shared content.

FIG. 3 is an illustration of a graphical display for composing a post to publish on the social networking system, according to an embodiment. In one embodiment, a user associated with an account 301 of the social networking system authors a post via a post creation interface 300. The post creation interface 300 includes a composition prompt 302 to author a post, where the users can enter message or status text 304 for the post. In response to the user entering a hyperlink, such as URL 306, into the composition prompt 302, the social networking system retrieves a set of data from the content host server targeted by the hyperlink.

The social networking system uses the retrieved data to create or otherwise select a preview image 308, a preview title 310, and a preview summary 312 to describe the content without requiring a viewer of the post to follow the hyperlink. In one embodiment, once the preview elements (e.g., preview image 308, preview title 310, and preview summary 312) are loaded into the post creation interface 300, the preview elements are retained if the post author removes or overwrite the hyperlink (e.g., URL 306) in the composition prompt 302. In one embodiment, the author of the post is presented an option to edit the preview summary 312 before submitting the post with a selectable submit button 318. However, the post author may not be able to substitute or edit the automatically generated preview elements if the content does not contain suitable alternative elements, or if the preview is constructed using content or publisher specific rules or guidelines that define the source material or structure of a preview. Once the author of the post has approved the preview, e.g., by clicking submit button 318, the post is submitted to the social networking system.

Figure 4:
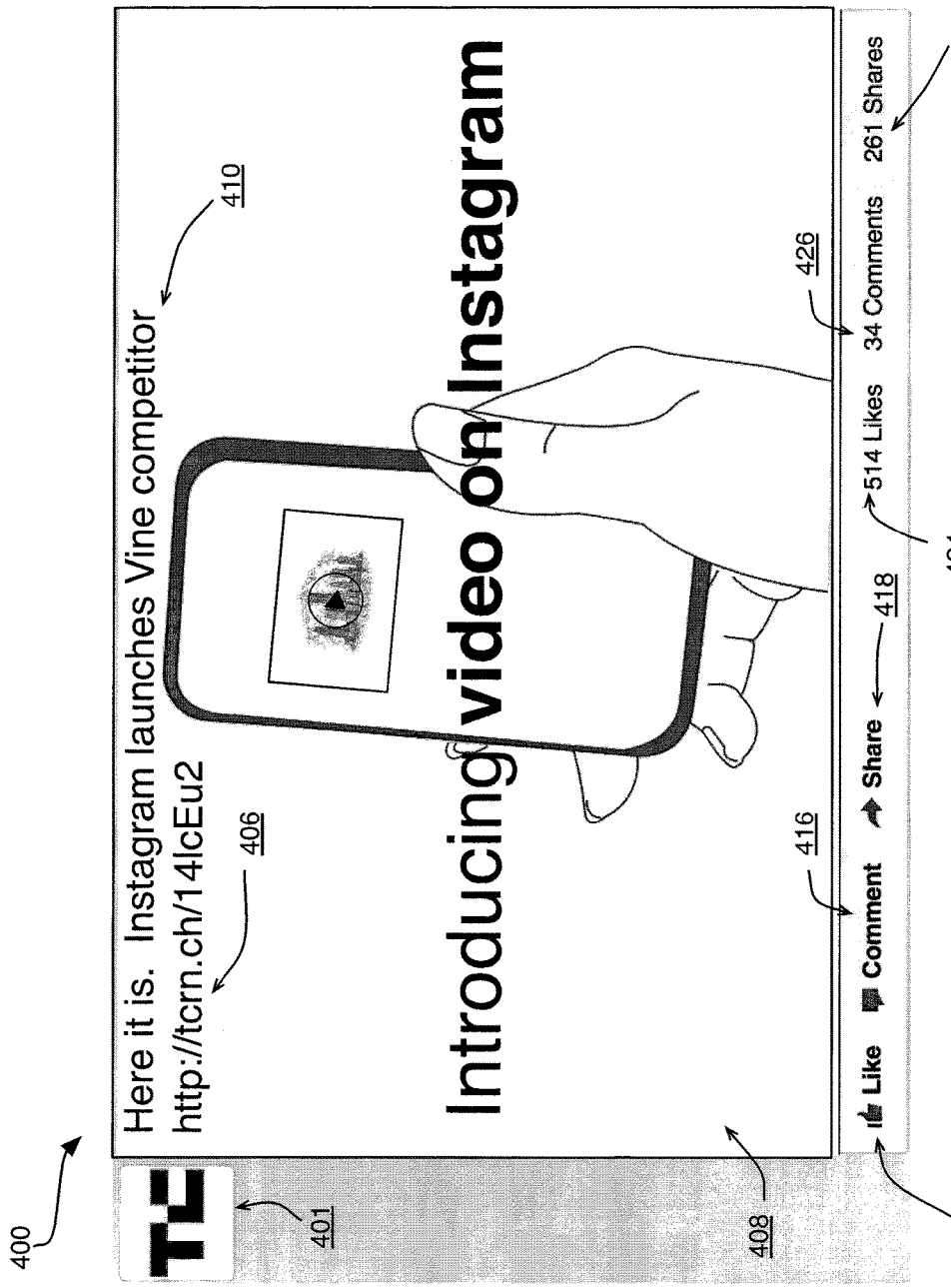
FIG. 4 is an exemplary illustration of a graphical display of a post containing a hyperlink and a preview of the content at the hyperlink destination.

FIG. 4 is an illustration of a graphical display of an exemplary published post containing a hyperlink and a preview of the content at the hyperlink destination. After a user authors and submits a post containing a hyperlink and a preview, the post containing the hyperlink and preview becomes visible to other users of the social network, as determined at least in part by the privacy settings of the user. When the post is displayed in, for example, a newsfeed of a user of the social networking system, the post contains elements such as a profile picture 401 associated with the user that is sharing the content, along with a preview image 408, preview title 410, and one or more follow-up actions (e.g., 414, 416, 418) associated with the post.

In one embodiment, such as in an social networking system interface provided by a mobile device application, the preview image 408 occupies the majority of the post 400, and the preview title 410, hyperlink 406, or other preview elements are displayed as a text overlay of the preview image 408. However, other post configurations are possible, and the configuration of the preview elements is not limited to any specific configuration.

As illustrated, the exemplary profile belongs to a news and media website that shares content, such as links to website publications, with users of the social networking system. The post 400 includes a hyperlink 406 with an associated preview to such content. In one embodiment, the popularity of a post is visible to some users of the social networking system, such as an administrator of a profile page associated with an organization or media publication. In such embodiment, a user (e.g., profile page administrator) is able to track social graph activity of a particular webpage, such as the number of likes 424 received by a post, or the number of comments 426, or re-shares 428 made by users that view the post.

In one embodiment, an entity with followers sets a popularity threshold for a post to meet before the post can be automatically shared with others, so that only popular posts are automatically shared. In one embodiment, as a post becomes more popular, the post can be automatically shared or re-shared to followers of the publication, or followers of related publications, or to users that have expressed affinity with (e.g., "liked") certain concepts embodied within a post. For example, when "TechCrunch" makes post (e.g., post 400) mentioning "Vine" and "Instagram," users that are identified as having an interest in the post publisher or the content contained within the post have the post automatically displayed in the newsfeeds of the users.

In one embodiment, preview generation for a shared content enables the follow-up actions that are performed on the published post 400. When the preview generation identifies user nodes or concept nodes associated with the content, a set of follow-up actions are presented to the user via selectable interface buttons (e.g., 414, 416, 418) to allow the user to interact with others on the social networking system. The selectable interface buttons graphically represent exemplary follow-up actions, such as Like button 414, Comment button 416, and Share button 418, although embodiments are not so limited, and other follow-up actions are possible. The viewing user can select the Like button 414, to express an affinity for concepts identified in the shared content (e.g., video on Instagram). The user can also comment on the post via the Comment 416 follow-up action, or can read comments posted by other users. Share button 418 enables a user to share the post with friends, followers, or other individuals within the social network of the user, as defined by the social graph edges connected with the user node of the user, and as limited by post specific or global privacy settings.

Figure 5:
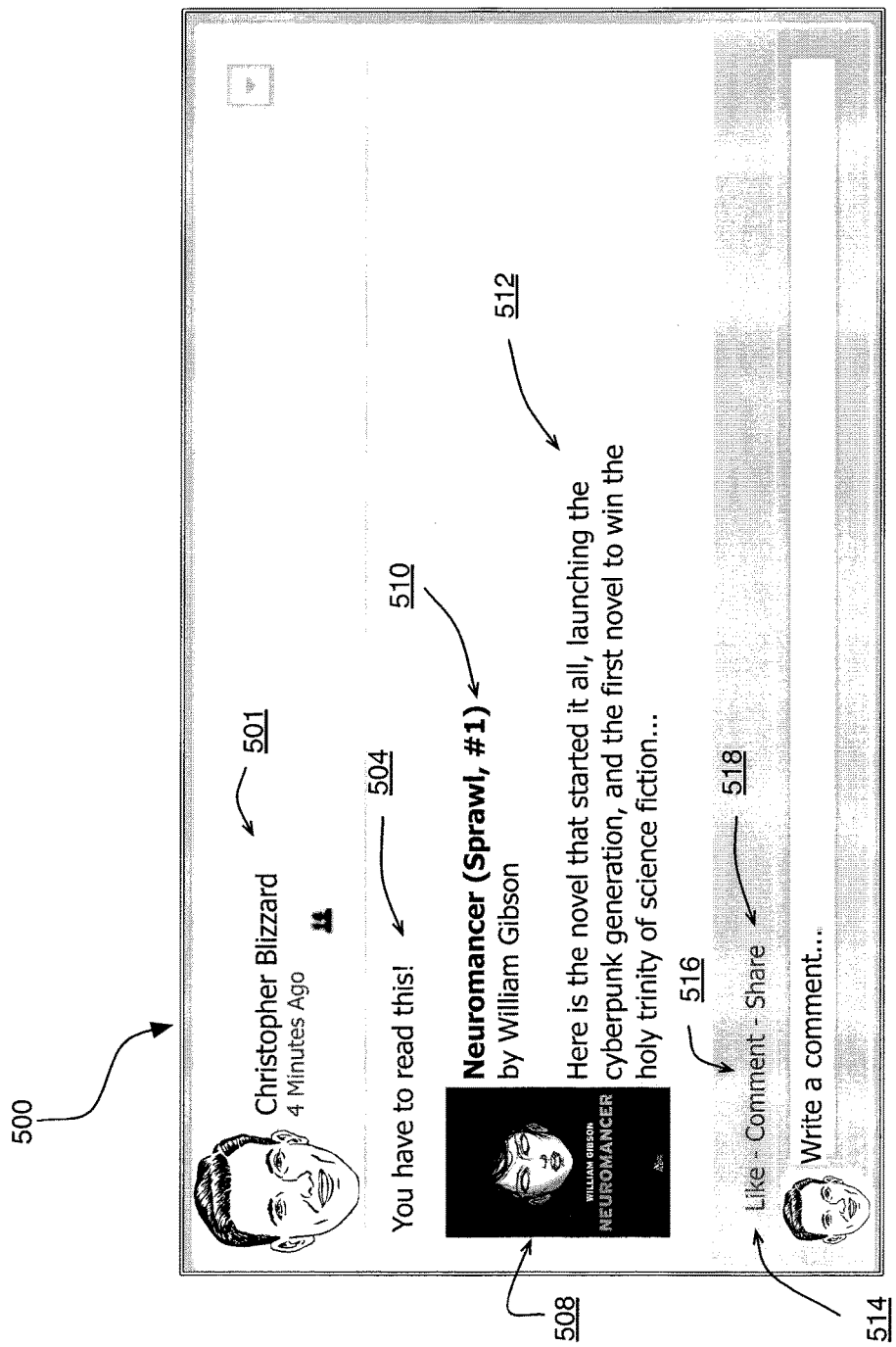
FIG. 5 is an exemplary illustration of a graphical display of a post that shares content from a publisher.

FIG. 5 is an additional illustration of an exemplary published post. In one embodiment, the published post 500 is displayed in association with a user profile 501 that indicates the identity of the author of the post, along with a relative timestamp of when the post was submitted and published on the social networking system. The posting user can include a message 504 (e.g., "You have to read this!") and can include a URL or other hyperlink to explicitly display the host of the shared content. As shown in FIG. 5, the URL (not shown) that triggers the preview can be removed from the post prior to submission, to display only the preview.

As described above, an embodiment of the social networking system determines the preview data from the source code of the target web page, and the publisher of the target web page can specify meta tags to provide hints, or possible candidates for each of the preview elements. In one embodiment, the meta tags are Open Graph tags, which indicate specific properties that are related to the tagged content, can be used to generate a preview for the content. The meta tags may further generate a concept node for the content, should a concept node not exist on the social graph. An exemplary set of tags utilizing sample Open Graph tags corresponding to FIG. 5 are listed in Table 2 below.

TABLE 2

Property tags using Open Graph tagging

| Attribute | Meta Tag |
| --- | --- |
| Title | property="og:title" content="Neuromancer (Sprawl, #1)" |
| Image | property="og:image" content="http://example.com/image/cover.jpg" |
| Description | property="og:description" content="Here is the novel that started it all, launching the cyberpunk generation, and the first novel to win the holy trinity of science fiction..." |
| Type | property="og:type" content="book" |
| Author | property="book:author" content="William Gibson" |

A host, author, or publisher of a third-party website, such as an online book store or an online application, such as a book tracking application, can define preview elements such as the preview image 508, preview title 510, and preview summary 512 using the tags displayed in Table 2. For example, a "Title" attribute can be defined using, for example, an HTML meta tag that loads the "og:title" tag with the content "Neuromancer (Sprawl, #1)," which indicates to the social networking system that the preview title 510 should be "Neuromancer (Sprawl, #1)." Likewise, the "og:image" tag indicates that the image at "http://example.com/image/cover.jpg" is to be used as a preview image 508, while the preview summary 512 should be, at least in part, based on the content stored in relation to the "og:description" tag.

Once data, such as a preview title 510 (including other relevant data, such as the preview author or publisher), preview image 508, or preview summary 512 is determined, a concept node for the data can be added to the social networking system, if such node does not already exist. The social networking system can then link the concept node to the social graph by creating edges between the concept node and the user nodes, as illustrated in FIG. 2 and described above. Additional social graph edges are created via the use of follow-up actions, such as the Like 514, Comment 516, and Share 518 buttons displayed in conjunction with the published post 500.

In one embodiment, the viewing user is presented with a selectable Comment 516 button that allows the viewing user to post one or more comments as to the post, the shared content referenced or linked to by the post, or the underlying concept represented by the post. Additionally, the viewing user can post comments in response to previous comments that have been posted by other users. In one embodiment, the comment system presented to the user displays comments by users within the social graph of the viewing user at the top of a list of comments, along with comments that have been deemed relevant to the topic or concept of the post.

In one embodiment, the viewing user is presented with a selectable Share 518 button, which allows the viewing user to share the post with a set of users within the viewing user's social graph, or that otherwise appear within the user's social network. In one embodiment, the social networking system enables a viewing user to author a post that is viewable to all users of the social networking system, as limited by a set of privacy settings.

Figure 6:
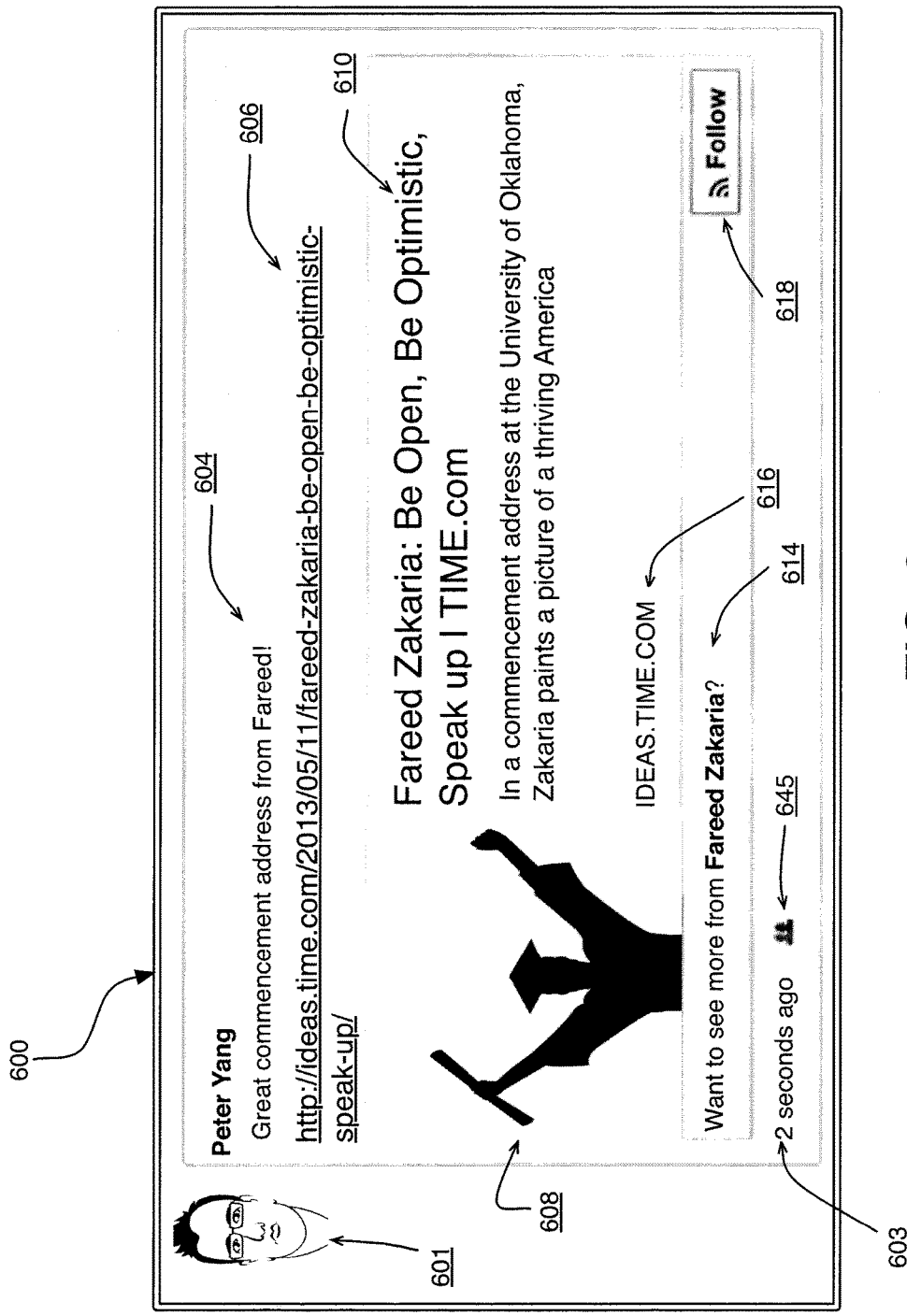
FIG. 6 is an additional illustration of an exemplary post by a user that includes a preview and several follow-up actions.

FIG. 6 is an additional illustration of an exemplary post by a user of the social networking system that includes a preview and several follow-up actions. A user 601 can submit a post 600 to the social networking system that contains a hyperlink 606 (e.g., a URL) to online content and a message 604 regarding the online content. In one embodiment, the age 603 of the post is displayed relative to the current time. In one embodiment, users are able to see the privacy level 645 of the post, to determine if the post is made only to the user viewing the post, in which case the post will appear only on the newsfeed of the user viewing the post, or if the post is visible to all of the friends of the posting user, or if the post is publically viewable by all users.

As described above, publishers of online content are able to define a metadata (e.g., Open Graph tags) to define specific data about the online content. For example, a publisher can use a metadata tag, "article:publisher" to tag online content that originates from the publisher. When an article having a publisher tag is shared on the social networking system, an embodiment includes a hyperlink 616 to a page defined by the publisher's user node on the social networking system.

Additionally, a content provider can define an "article:author" tag (e.g., property="article:author" content="Fareed Zakaria"), to specify the author of the media content shared on the social networking system. In the exemplary preview of FIG. 6, both an author and publisher are defined, and are displayed in the preview title 610 of the article. The author metadata tag allows an embodiment of the social networking system to include a hyperlink 614 to a page defined by the author's user node on the social networking system as a follow-up action (e.g., a hyperlink to the author's profile page, website, or other content by or about the author).

Several follow-up actions can be performed via buttons displayed in conjunction with the preview of the shared media content when the media is displayed on the social networking system. In the exemplary post 600, a selectable "Follow" button 618 is displayed to allow a user to become a follower of the author or publisher of the content. In one embodiment, a hyperlink 614 to a page representing the user node of the author is displayed to allow a user to view additional content from the author or to become a follower of the author. In one embodiment, a hyperlink 616 to a page representing the user node of the publisher is displayed to allow a user to view additional content from the publisher or to become a follower of the publisher. In one embodiment, the hyperlink 616 directs the user to a third-party website of the publisher.

In one embodiment, the social networking system utilizes content information from the message 604 posted by the author of a post when sharing the hyperlink 606 to determine the most relevant preview element out of the element candidate. For example, in the message post, the post author mentioned a "commencement address," and "Fareed." When generating a preview image 608, the social networking system utilizes the message text as positive indicators for images that are relevant to commencement, such as photos that are recognized by the social networking system as containing images relevant to a commencement or graduation, such as the cap and diploma image displayed as the preview image 608. The name "Fareed" also appears in the message 604 from the post author, which correlates with "Fareed Zakaria," the author of the linked article. As a result, a photo determined to be relevant to Fareed Zakaria may be considered as a candidate for the preview image 608.

In one embodiment, the social networking system utilizes a facial recognition algorithm. Should an image of the author appear amongst the set of image preview candidates, the social networking system facial recognition may detects the face of the author, identified by a meta tag or other means, and shows the image of the author's face as a preview image 608.

Figure 7:
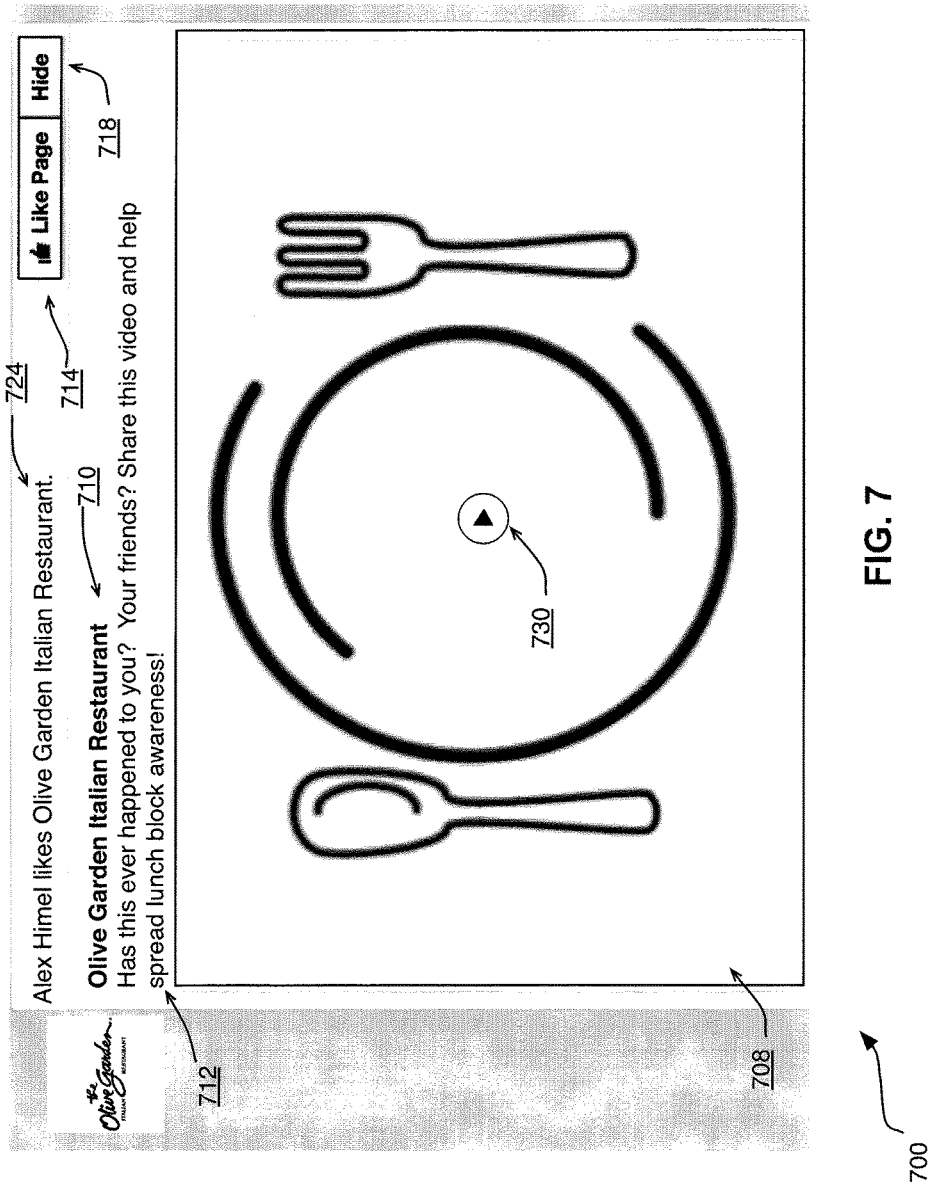
FIG. 7 is an exemplary illustration of a preview of shared media.

FIG. 7 is an exemplary illustration of a preview of shared media. In one embodiment, users of the social networking system (e.g., individuals, corporations, organizations, etc.) are able to share posts containing embedded media. Post 700 is an exemplary post containing a preview of a video, which can be played directly within the post via the use of a play button 730 displayed in the preview image 708. In one embodiment, a preview title 710 is displayed above the preview image 708, along with a preview description 712 of referencing the embedded video. In one embodiment, several follow-up actions are displayed along with the post to provide information to the viewing user of the post or to enable the viewing user to perform social actions with the post. In one embodiment, the social network system displays an informational statement 724 to indicate that the particular post is appearing on a user's newsfeed because of a "like" indicated by a friend of the user. In response, the user can also choose to like the post, by selecting a selectable button 714, or the user can select an additional Hide 718, which will hide the display of the post 700.

Figure 8:
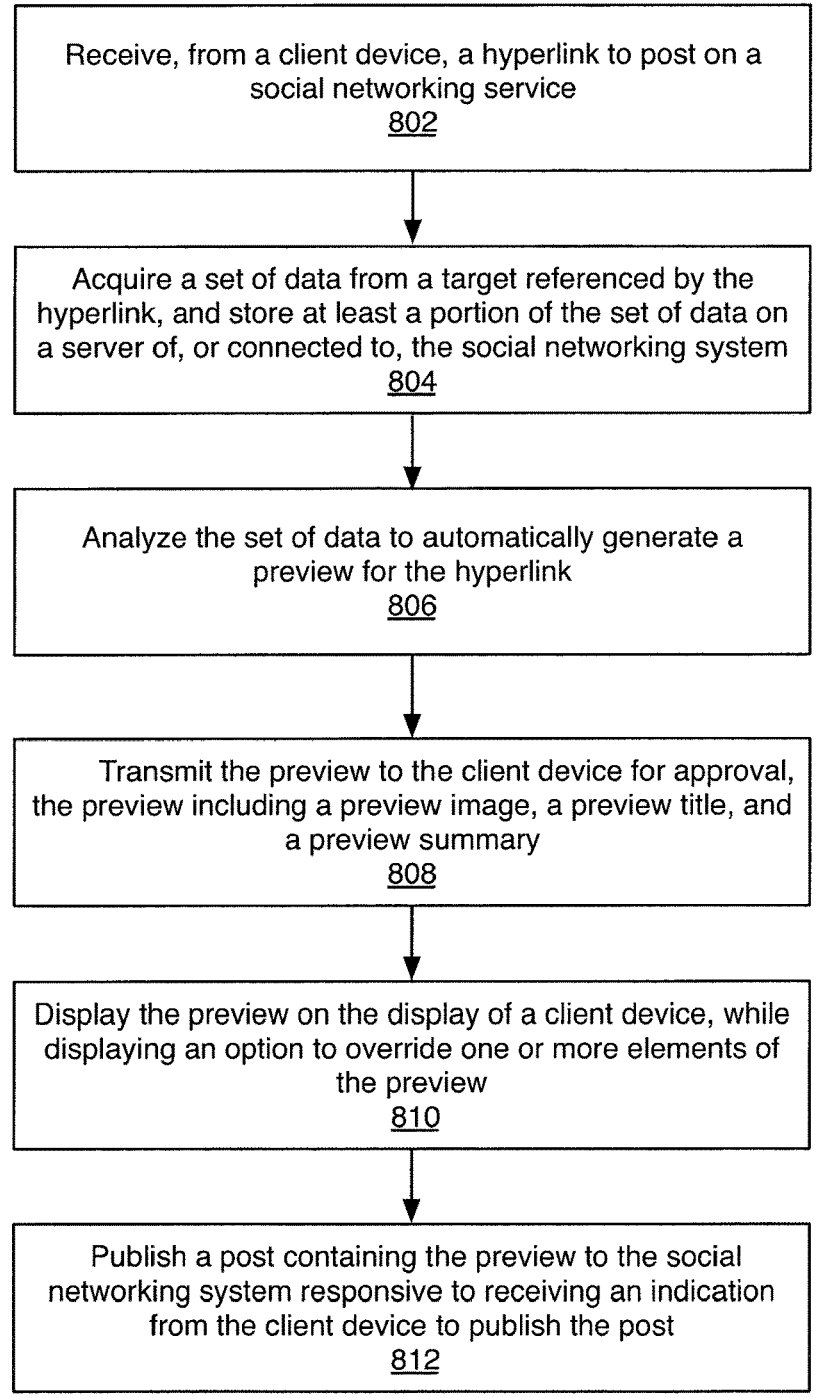
FIG. 8 is an exemplary flow diagram of a computer-implemented method of generating preview elements.

FIG. 8 is an exemplary flow diagram of a computer-implemented method of generating preview elements for a post containing a hyperlink to online content. A user may use a web browser or special-purpose client application on a client device to access a third-party website, e.g., by sending an HTTP or HTTPS request to web server, causing the web server to access the one or more data stores and serve one or more web pages or frames to be displayed in the web browser or the special-purpose client application. If the user finds the content on the third-party website to be of interest, the user may elect to share a hyperlink to the third party content with other users of the social networking system.

As shown at block 802, an embodiment of the social networking system receives, from a client device, an electronic message containing a hyperlink that the user wishes to share. In response to receiving the hyperlink, one or more servers of the social networking system perform operations to acquire data from the third-party website, as shown at block 804. The one or more servers store at least a portion of the set of data on a server connected to, or otherwise associated with the social networking system. In one embodiment, a version of the target data is already stored on a server of the social networking system, and the social networking system captures and stores an updated version of the data responsive to an attempt by a user of the social networking system to share content referenced by the hyperlink target.

The social networking system automatically generates a preview for the online content referenced by the hyperlink in response to receiving a complete and valid hyperlink. In one embodiment, once the social networking system has acquired at least a portion of the data from the server or data store that is the target of the hyperlink, one or more servers execute an algorithm to analyze the set of data and automatically generate a preview for the hyperlink, as shown at block 806. The one or more servers executing the algorithm generate a set of preview candidates for potential preview elements. A set of preview candidates for potential preview elements can be derived using metadata defined for a web page, or from analysis of the body of the web page. Using the preview element candidates, the one or more servers automatically select the appropriate preview elements by considering signals for each potential preview element, as generated by the analysis of the acquired content. Signals to the algorithm include positive and negative signals. Positive signals to the algorithm indicate that a particular image, name, or sentence is relevant or appropriate to use in describing the linked content or as a preview element. Negative signals to the algorithm indicate that a particular image, or other data element, may not be suitable for use in the automatically generated preview. Additional detail on preview generation is described in FIG. 9-12 below.

As shown at block 808, an embodiment of the social networking system transmits the automatically generated preview to the client device of the author of the post to allow the author of the post to view and approve the automatically generated preview. In various embodiments, the preview includes one or more of a preview image, a preview title, and a preview summary.

As shown at block 810, an embodiment causes the client device to display the preview. In one embodiment, the author of the post is presented with several alternative preview elements, such as an alternative preview image or title, to replace the automatically generated preview image or preview title.

In one embodiment, the author of the post is presented an option to edit the preview summary before submitting the post. However, the post author may not be able to substitute or edit the automatically generated preview elements if the content does not contain suitable alternative elements or if the preview is constructed using content specific criteria (e.g., as defined by the publisher of the linked content).

Once the author of the post has approved the preview, the post can be submitted to the social networking system. As shown at block 812, the social networking system publishes the approved post containing the preview to the social networking system responsive to receiving an indication from the client device to publish the post.

Figure 9:
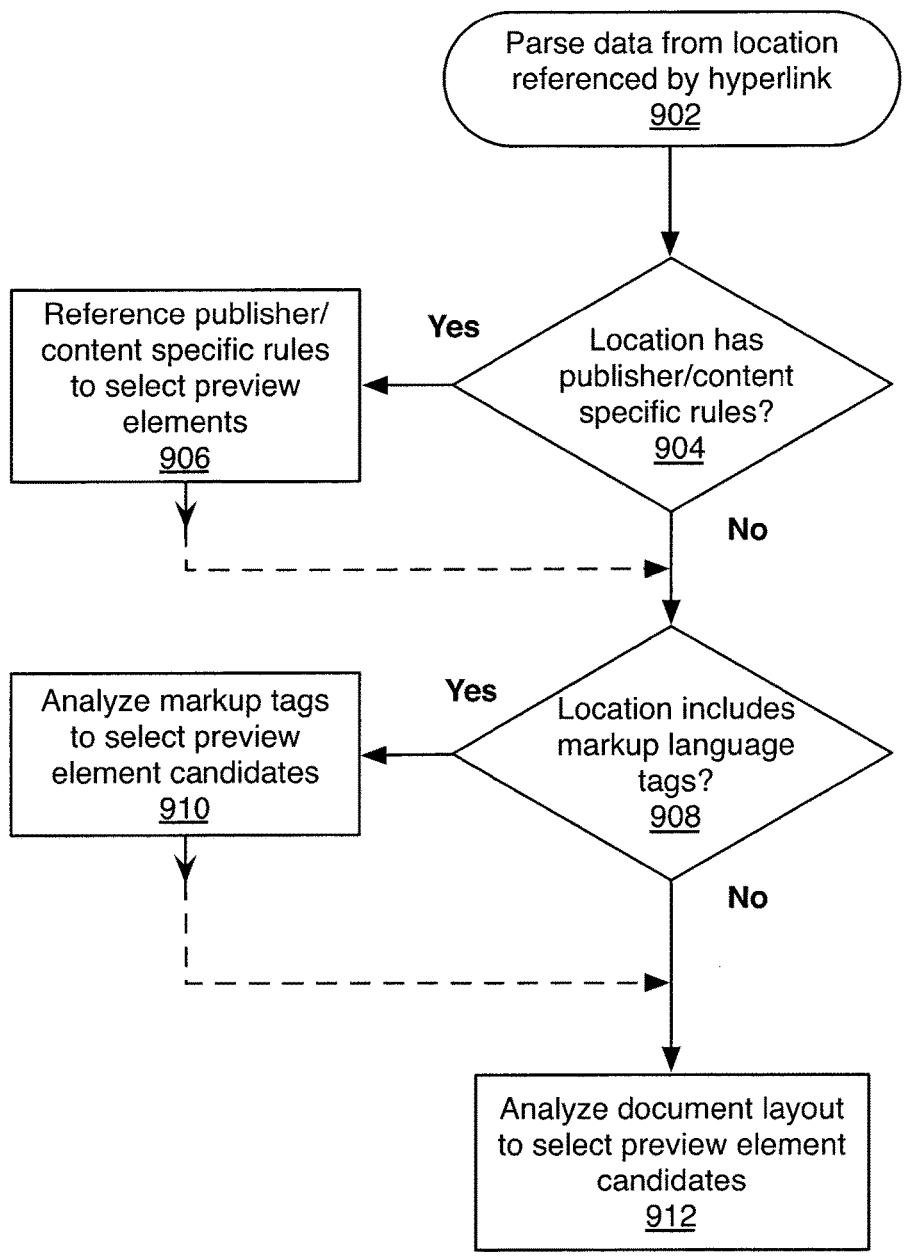
FIG. 9 is an exemplary flow diagram of a computer-implemented method of generating preview element candidates.

FIG. 9 illustrates an exemplary flow diagram of a method of data analysis for online content when generating a set of preview element candidates. As shown at block 902, responsive to receiving a valid hyperlink from a composition prompt of an interface at an electronic device, the social networking system retrieves and parses data from the location referenced by the hyperlink.

In one embodiment, established media publishers have a set of domains that are verified to host the official websites of the publication. Web pages on a verified domain are known to have a particular layout, allowing pre-defined publisher specific rules. If the location/resource (e.g., web page or similar online document) referenced by the hyperlink, as determined at block 904, has pre-defined publisher specific rules, then the social networking system references the publisher specific rules to select the preview elements, as shown at block 906. Administrators of the social networking system may define publisher specific rules for a content hosted on a domain. The rules allow consistent preview generation for the domain without extensive data analysis of the content. When processing a preview for a web page hosted by a domain with a consistent layout, the preview generation algorithm will consistently find data for the various preview elements in a specific location on the web page. For example, a particular domain will consistently publish pages that contain a publication date and time stamp, followed by an article title, one or more sentences suitable for a preview summary, and an author byline for the article. Additionally, a preview-suitable image will consistently be the first image in the body of the article, or will be of a consistent size, or in a consistent position within the article.

In one embodiment, publisher specific rules are generalized as content specific rules, so that certain content is handled consistently. For example, online photo galleries following a particular layout are processed in a consistent manner. Additionally, online news sites following a particular layout are processed in a consistent manner. In one embodiment, the publisher or content specific rules are exclusive, and no additional parsing of the target data occurs to determine the preview elements for the automatically generated preview. In an alternate embodiment, the publisher or content specific rules are used in conjunction with other data analysis methods, and the logic flow for the preview proceeds to block 908.

In one embodiment, the social networking system determines, as shown at block 908, if the location is a web page or a similar online document containing markup language tags, such as HTML meta tags or Open Graph tags. The tags allow a content publisher to define how previews are generated for content acquired from a third-party server. If the markup language tags are present, the social networking system analyzes the tags to select one or more preview element candidates, as shown at block 910. In one embodiment, the tags are definitive of the preview, such that the tags within the target document define each preview element and alternate preview elements are not sent to the client device.

In one embodiment, the preview elements specified by the tags are analyzed in conjunction with preview element candidates determined by text layout analysis of the target document, as shown at block 912. For example, preview element candidates that are determined via document analysis are used to verify candidates specified via metadata tags. In one embodiment, the social networking system transmits both types of candidate elements to a client device as alternative preview elements that are selectable by the user. If metadata tags are not used, or are not available, document analysis is used to both select and rank preview candidates. An example of preview candidate ranking is described with respect to preview images in FIG. 10 below, although the description is also generally applicable to preview title and preview summary candidates.

Figure 10:
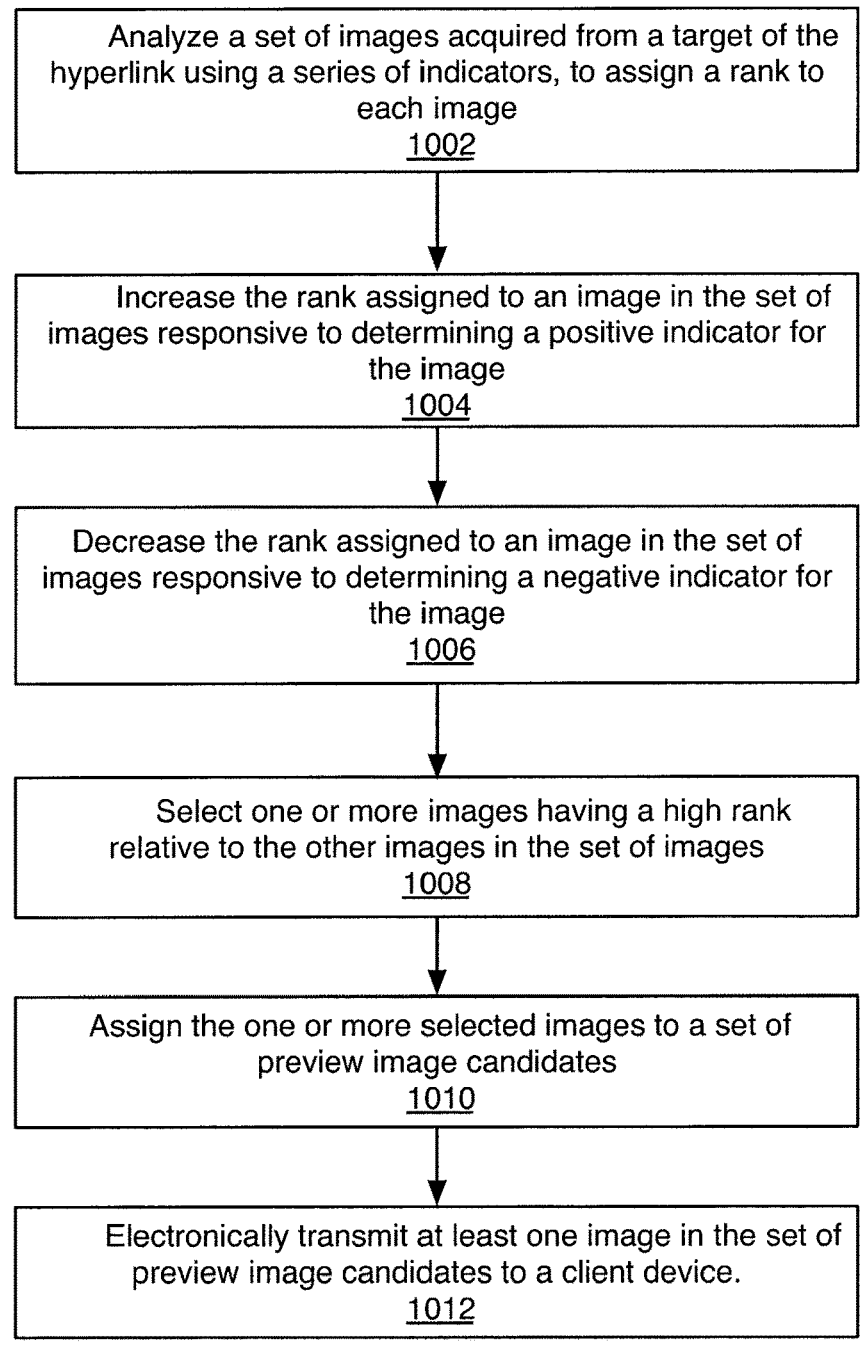
FIG. 10 is an exemplary flow diagram of a method of analyzing a set of images to determine a set of preview image candidates.

FIG. 10 illustrates an exemplary flow diagram of a method of analyzing a set of images to determine a set of preview image candidates. In one embodiment, a set of preview image candidates are determined by a preview image generation system by analyzing the relative characteristics of the images displayed on a website or other online content targeted by a hyperlink.

As shown at block 1002, a preview image generation system of, for example, a social networking system, analyzes a set of images acquired from a target of the hyperlink using a series of indicators and assigns a rank to each image based on the indicator analysis. The indicators include positive and negative signals to the analysis algorithm, which increase or decrease the relative rank of/assigned to an image in comparison to the other images acquired from the hyperlink target.

As shown at block 1004, the algorithm will increase the rank assigned to an image (e.g., from a default value) in the set of images responsive to a determination of a positive indicator for the image. In contrast, at block 1006, the algorithm will decrease the rank assigned to an image in the set of images responsive to determining a negative indicator for the image.

Example positive indicators for an image include the determination that an image is a full-scale version of an image in an image gallery (e.g., above a threshold/comparatively larger size, resolution, etc.), while other images in the set are thumbnail images or otherwise of a lower resolution, smaller size, etc. In contrast, if an image is determined to be a thumbnail image, where a larger or higher resolution image is available in the set of images, the algorithm considers the image negatively indicated.

In one embodiment, positive or negative indicators are dependent upon content type. For example, in a news article, an image containing one or more faces, particularly images that are recognized as relevant to the article, would be a positive indicator for the image. In some scenarios, images of a particular file type are preferred, depending on the content referenced by the hyperlink. In one embodiment, JPEG format images are ranked higher than images in the GIF format when the linked content originates from an image sharing website. In one embodiment, PNG images are preferred over both JPEG and GIF images. When a hyperlink target is an image gallery featuring high-resolution images or a news article featuring images of the news article subjects, images in the JPEG format may be preferable because a compressed image may allow for a reduced file storage size while presenting sufficient image quality for a preview image.

In one embodiment, various image analysis techniques are employed during preview generation to increase or decrease the rank of an image. For example, a face detection algorithm is used to detect and identify faces within preview image candidates. Images in which a face is detected are preferred for use to preview particular content, such as news articles. The algorithm can also detect meme images (e.g., images with text overlay) and determine whether or not to show such images as a preview, depending on the type of content targeted by a shared hyperlink. An Optical Character Recognition (OCR) engine can be used to determine if an image contains a particular amount of text, which may be a positive or negative signal, depending on the type of content referenced by the hyperlink. Additionally, the preview generation system uses the OCR engine to recognize an embedded copyright watermark used by a photographer with a profile on the social networking system. In this instance, the social graph of the photographer is analyzed, and social graph connections to user nodes or concept nodes related to the photographer can be traversed to determine if the photographer is related to other content gathered from the hyperlink target during the preview generation process.

The presence of a copyright on image material acts as a positive or a negative signal under varying circumstances. For example, images under a copyright owned by a one or more organizations may be excluded as a preview candidate based on configuration parameters for the preview generation system. In one embodiment, images from other organizations are allowed. In one embodiment, the preview generation system analyzes text located near or otherwise associated with images displayed within online content to determine if a copyright is asserted for an image. A distinction is also made if the preview generation system is able to recognize a license asserted with respect to an image or with respect to the online content in general. The assertion of a restrictive license within content is a negative indicator to the algorithm unless configured otherwise. However, the recognition of a permissive license is a positive indicator. In one embodiment, the copyright or another form of attribution or credit is included in the preview in response detecting the presence of a copyright.

As an additional example, a negative indicator is determined for banner advertisements or other advertisement images. Advertisement images can be identified based on the placement of the image on the page, the size of the image, and/or if the origin of the image is determined to be an advertisement website. Additionally, advertisement images are often served by a server or from a location that is distinct from the other images on the target site.

Where a publisher utilizes tags, such as Open Graph tags, the image specified in a tag (e.g., og:image) is accepted as a highly positive indication that the image specified is to be used as the preview image. In one embodiment, where an image is specified via an Open Graph tag, the image specified is used as the preview image and alternate images are not supplied.

After increasing or decreasing or otherwise determining the rank of at least some of the available images according to positive and negative indicators, one or more images are determined to have a high rank relative to other images from the hyperlink target. As shown at block 1008 of FIG. 10, one or more images having a high rank are selected by an embodiment of the social networking system. The one or more selected images are assigned to a set of preview image candidates, as shown at block 1010.

As shown at block 1012, the social networking system electronically transmits at least one image in the set of preview image candidates to a client device of the author of a post containing the hyperlink. After viewing the preview, the author of the post can submit the post for publication to the social networking system. Alternatively, the author of the post can reject the automatically generated preview and post a hyperlink without the generated preview. When multiple preview image candidates are available, the author of the post can request to see one or more additional preview image candidates. In response, an embodiment of the social networking system transmits an alternate preview image to the client device of the author for display.

Although this method is described with reference to preview image generation, it will be understood that the details are relevant to the generation of other preview elements. Positive and negative indicators for various titles or sentences may reflect positively or negatively upon the rank of candidate titles or candidate sentences for the preview summary. For example, a positive indicator for a preview title is if the text of a preview title candidate is found repeatedly throughout the body of the referenced content. A negative indicator is if the text of a preview candidate does not, or rarely appears in the body of the referenced content.

Figure 11:
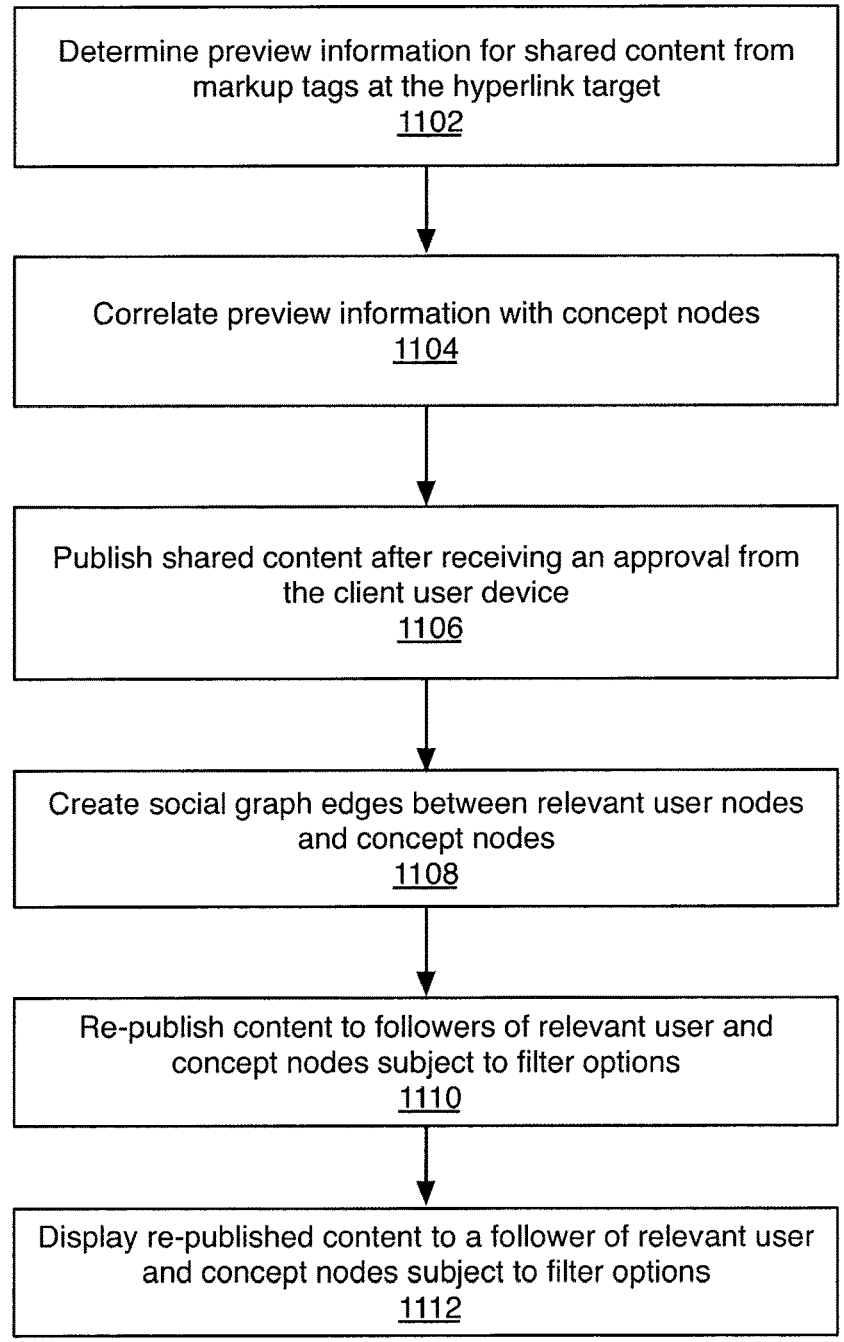
FIG. 11 is an exemplary flow diagram for relating concepts represented by shared content with users of the social networking system.

FIG. 11 is an exemplary flow diagram for relating concepts represented by shared content with users of the social networking system. As shown at block 1102, an embodiment of the social networking system determines preview information for shared content from markup tags at a target of a shared hyperlink. The preview information is determined using any one of the methods described herein. However, using a tagging mechanism, such as Open Graph tagging, better enables the social networking system to correlate preview information with concept nodes, as shown at block 1104. In response to receiving an approval of the preview from the user at the user device, at block 1106, the social networking system publishes the post.

As a follow-up action to the publication of the post, an embodiment of the social networking system creates social graph edges between the relevant user nodes and concept nodes, as shown at block 1108. For example, when a user with followers publishes content to the social networking system or a third-party web page, the published content is re-published to followers of the user. Additionally, when a user publishes content that is related to concepts defined by one or more concept nodes of the social graph, the published content is re-published to other users with connections to the related concept nodes.

As shown at 1110, the shared content at the hyperlink is re-published to followers of the relevant user or concept nodes subject to filtering options defined by the various users or profile page administrators of the social networking system. For example, a user with followers can set filter options such that an article, blog post, song, or other media or content that is shared by the user or determined to be related to the user will not be automatically shared with the user's followers until or unless the shared content receives a certain number of social graph actions by other users, such as likes, shares, or comments. Additionally, a follower of a user can also select an option to not have links or content automatically displayed until or unless the content at the link has received a certain number of actions (e.g., likes, shares, etc.).

As shown at block 1112, the social networking system displays the re-published content to a follower of relevant user and/or concept nodes once the post receives a sufficient number of social graph actions to surpass any filter options.

Figure 12:
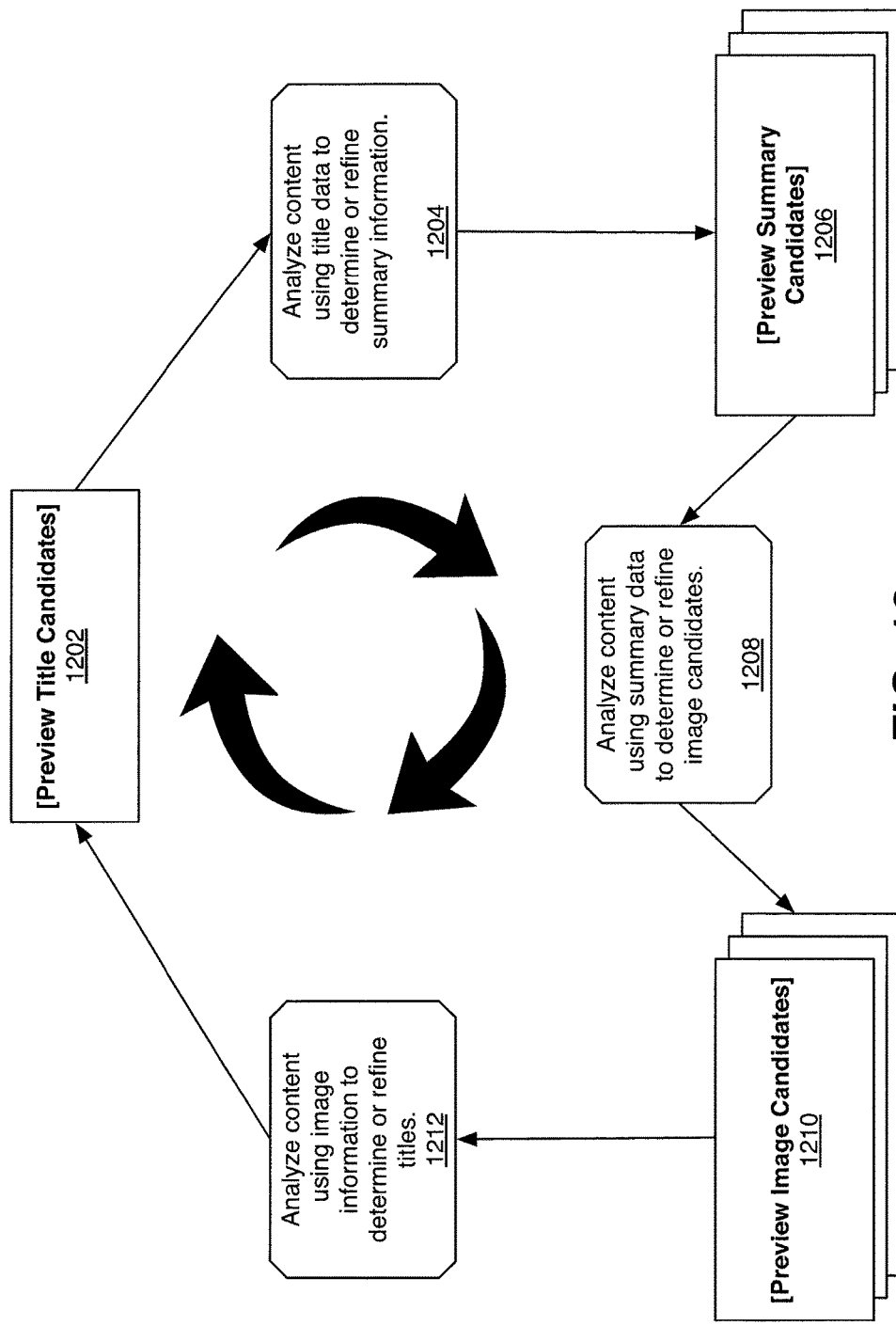
FIG. 12 is an illustration of an exemplary data flow during a preview element cross check.

FIG. 12 is an illustration of an exemplary data flow during a preview element cross check. In one embodiment, the social networking system crosschecks preview elements to gather additional preview element candidates or to verify that the preview elements are coherent. As described above, the social networking system analyzes data from the target of a hyperlink and generates one or more preview element candidates (e.g., preview title candidates 1202, preview summary candidates 1206, preview image candidates 1210). For example, where the data allows a set of one or more preview title candidates 1202 to be generated, an embodiment uses the candidates as input for an analysis module to perform an operation 1204. Operation 1204 includes analyzing the referenced content to generate a set of preview summary candidates 1206. The preview summary candidates 1206 are used in an operation 1208 to analyze content to determine a set of preview image candidates 1210. Moreover, the preview image candidates 1210 are available as input for an operation 1212 to analyze the content scraped from the hyperlink target to verify, refine, or determine a set of preview title candidates 1202, or to select a preview title from the set of candidates. While a linear sequence of analysis is shown, the analysis operations may proceed in alternate sequences, or in parallel. For example, title data may be used to determine or refine preview image candidates, while preview summary candidate may be used to determine or refine preview title candidates, and so forth. Each analysis operation is described in detail below.

In one embodiment, keyword analysis is performed using the title as a query for a keyword search, to determine a set of relevant sentences, though other analysis methods are possible. For example, if a user were to author a post that includes a hyperlink to an online newspaper article titled "President Obama's 2014 budget proposal," the social networking system uses the title to perform operation 1204. In such an example, operation 1204 includes analyzing the text of the article to find sentences which contain references to, or variants of words or phrases containing, for example, "President," "Obama," "budget," or "proposal." Accordingly, a sentence in the article, which states, "President Obama unveiled a $3.77 trillion spending plan on April 10 that proposes . . . " would be selected as a relevant sentence. In one embodiment, words related to words or phrases in the title are determined (e.g., by the concept tagging module 165 of FIG. 1), and those words or phrases are searched. For example, an additional sentence in the article stating, "The proposal includes modest new investments in infrastructure and education, and major new taxes for the wealthy," is selected in one embodiment, because the words "investment," "infrastructure", "education," and "taxes" are relevant words for a news article with a title which includes the words "budget," and "proposal." Additionally, in an embodiment where related words are searched, "spending plan" in the first sentence above would also flag the sentence, because of the conceptual relationship between "budget" and "spending plan."

In one embodiment, operation 1204 also includes analysis of comments left by other users of the social networking system. For example, when a second user posts a hyperlink to re-share content shared by a first user of the social networking system, comments posted by users in the social graph of the first user are analyzed to determine if any of the comments posted include keywords matching any of the preview title candidates 1202. Sentences in the comments of the post of the first user that include keywords matching the preview title candidates 1202 then influence the selection of preview summary candidates 1206 for the preview summary.

In one embodiment, file data or metadata for scraped images is analyzed in an operation 1208 by the data processing system using summary data to determine or refine candidates for the preview images. In an embodiment in which a set of image candidates has already been selected, image candidates with metadata that correlates with information contained within the summary data result in a positive signal and corresponding a rank increase. Likewise, images that do not at all correlate with the summary data result in a negative signal and corresponding rank decrease.

In an embodiment of the social networking system that is able to identify and distinguish faces within an image, faces that are relevant to the summary data are identified. For example, a user can share a hyperlink to an article on a newspaper website and an embodiment of the social networking system determines the hyperlink will have a tag-defined preview title of, "Obama releases a budget plan with a simple goal: Ending the debt standoff." In this example, the content provider also tag-defined a description for the article "In the first budget of his second term, President Obama set aside the grand ambitions that marked his early days in office and sent Congress a blueprint aimed at achieving a simple goal: ending the long partisan standoff over the national debt." An embodiment of the social networking system utilizing facial recognition would, in operation 1208, recognize an image including the face of President Obama and assign the image a high image ranking relative to other images. In one embodiment, images related to "budget plan," "debt," or "standoff" would also receive a high image ranking. The social networking system can be tuned to determine whether images containing relevant faces, images containing any face, or images containing other relevant images are ranked the highest.

In one embodiment, a preview image and/or a set of one or more preview image candidates 1210 are available for use as input to operation 1212. In operation 1212, the social networking system analyzes the content scraped from the hyperlink target to verify, refine, or in some cases, determine a set of preview title candidates 1202 or to select a preview title from the set of candidates. Generally, between metadata tagging for online content and data used for the preview summary, a title is readily able to be determined for a hyperlink preview. However, the media content may be an image gallery lacking a metadata tag for a title and/or otherwise include little to no text. In such an instance, the social networking system utilizes operation 1212 to analyze content using image information to determine or refine a preview title. For example, the image filename or other image metadata can be used as the preview title. In one embodiment, when the social networking system is able to make a positive determination of one or more faces within the image, the subject of the image is used as a preview title.

Figure 13:
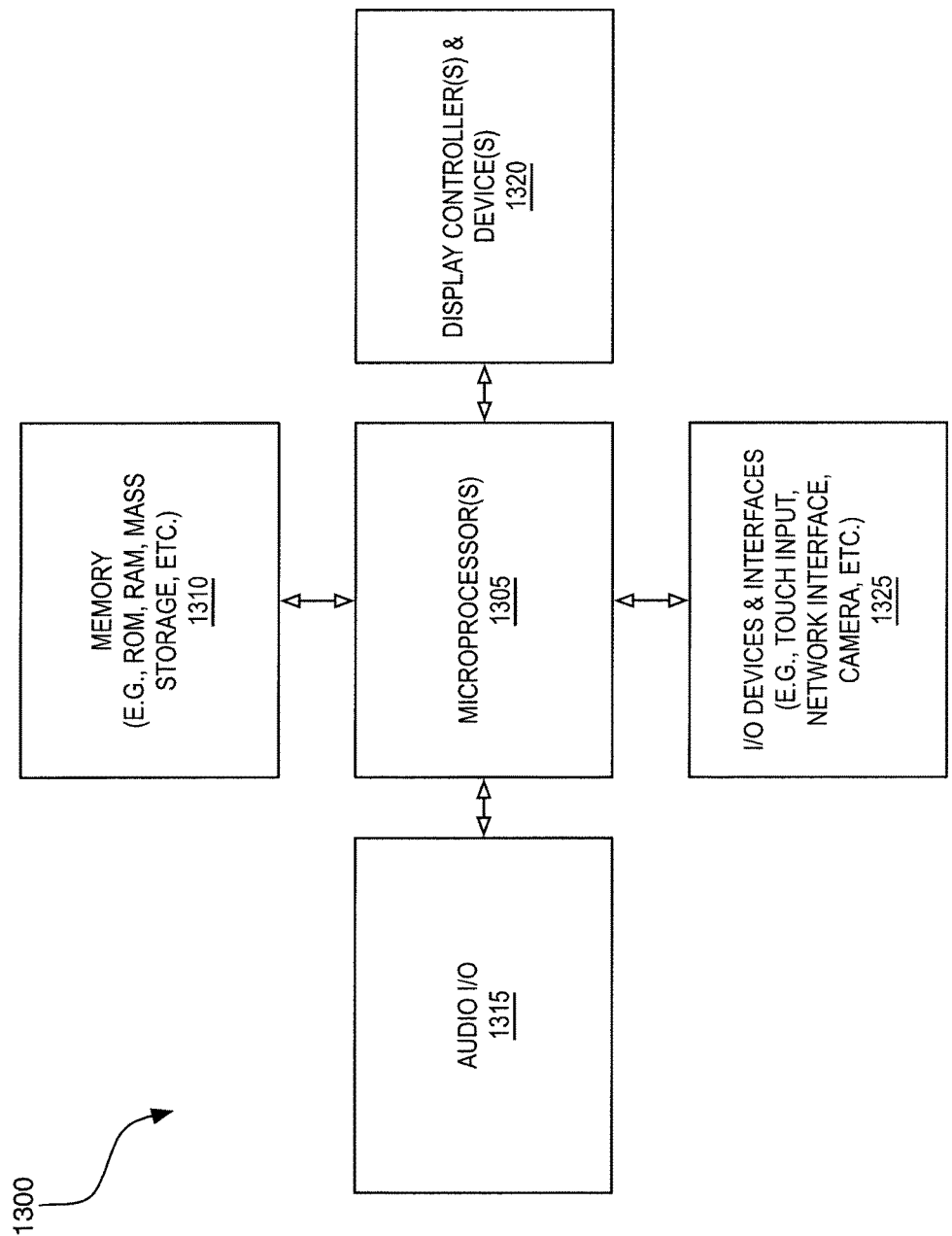
FIG. 13 a block diagram of an exemplary computing system.

FIG. 13 is a block diagram of an exemplary computing system, which can be utilized as an electronic device or data processing system as described herein. The computing system 1300 includes one or more microprocessors 1305, which may be incorporated on a system on an integrated circuit, or connected to other system components via multiple connected chips). The computing system 1300 includes memory 1310, which is coupled to the microprocessor(s) 1305. The memory 1310 is used for storing data, metadata, and programs for execution by the microprocessor(s) 1305, and includes components based upon one or more memory technologies, such as semiconductor based Dynamic or Static Random Access Memory ("D/SRAM"), or Read Only Memory ("ROM"), which can be volatile or nonvolatile in nature. The memory 1310 also includes a mass storage device to store non-executing instructions. In one embodiment, the mass storage device is a solid-state disk ("SSD") based on Flash, Phase Change Memory ("PCM"), or other types of data storage technologies. In various embodiment, the memory 1310 is internal or distributed memory.

The computing system 1300 also includes an audio input/output subsystem 1315, which includes some form of a microphone for audio input, to record audio or receive voice instructions, to be executed by the microprocessor(s) 1305, and a speaker, or other audio output device to, for example, play back music or other audio. Additionally, a display controller and display device 1320 work in concert to provide a visual user interface for the user.

The computing system 1300 also includes one or more input or output ("I/O") devices and interfaces 1325, which are provided to allow a user to provide input to, receive output from, and otherwise transfer data to and from the system. These I/O devices and interfaces 1325 may include a mouse, keypad or a keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers.

The I/O devices and interfaces 1325 also include a connector for a dock or a connector for a USB interface, FireWire, Thunderbolt, Ethernet, etc. to connect the computing system 1300 with another device, external component, or a network. Exemplary I/O devices and interfaces 1325 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the computing system 1300 with another device, external component, or a network and receive stored instructions, data, tokens, etc. It will be appreciated that one or more buses, may be used to interconnect the various components shown in FIG. 13.

In one embodiment, the computing system 1300 is an exemplary representation of a client user device, such as user device 104A-104N of FIG. 1. Accordingly, the computing system 1300 is configurable as a personal computer, including a tablet-style computing device and personal digital assistant, (PDA), a cellular telephone with PDA-like functionality, a Wi-Fi based telephone, a handheld computer which includes a cellular telephone, a media player, an entertainment system, or devices which combine aspects or functions of these devices. In another embodiment, the computing system 1300 is an exemplary representation of a server computer in the social networking system 130 of FIG. 1.

In one embodiment, the computing system 1300 is a network computer, server, or an embedded processing device within another device or consumer electronic product. As used herein, the terms computer, system, device, processing device, computing apparatus, and "apparatus comprising a processing device" is used interchangeably with the computing system 1300 and include the above-listed exemplary embodiments.

It will be appreciated that additional components, not shown, may also be part of the computing system 1300, and, in certain embodiments, fewer components than that shown in FIG. 13 may also be used in a computing system 1300. Accordingly, the methods disclosed herein are not limited to any specific combination of hardware circuitry and software, or to any particular source for the instructions executed by the computing system 1300. Computer-implemented methods may be carried out in a computer system or other data processing system in response to its processor or processing system executing sequences of instructions contained in a memory, such as memory 1310 or other non-transitory machine-readable storage medium. Additionally, the software may further be transmitted or received over an I/O device or interface 1325, such as a network interface. In various embodiments, hardwired circuitry may be used in combination with the software instructions to implement the present embodiments.

It will be apparent from the description that aspects of the devices, systems, and methods described may be embodied at least partially in software. In other words, computer-implemented methods may be carried out in a computer system or other data processing system in response to its processor or processing system executing sequences of instructions contained in a memory. For example, instructions can be embodied in an article of manufacture, which is used to store program code providing at least some of the functionality of the embodiments described above.

An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, the various embodiments may be implemented in hardware or firmware utilizing a Field-Programmable Gate Array (FPGA), Application-Specific Integrated Circuit (ASIC), a processor, a computer, or a computer system including a network, but are not limited as such. Modules and components of hardware or software implementations can be divided or combined without significantly altering the embodiments.

While the flow diagrams in the figures described herein show a particular order of operations performed by certain embodiments, it should be understood that such order is exemplary. For example, the methods described herein may be performed with fewer or more features/blocks or the features/blocks may be performed in differing orders. Additionally, the methods described herein may be repeated (e.g., iterated, recursed, etc.), or performed in parallel with one another or in parallel with different instances of the same or similar methods.

The various embodiments have been described in the specification and figures, along with additional specific details to enable one skilled in the art to practice the embodiments. While such specific details have been set forth herein, it should be understood that the various embodiments could be practiced without these specific details. Accordingly, it is to be understood that the examples and illustrations used to describe the various embodiments are not to be limiting. Thus, various modifications may become apparent to those skilled in the art without departing from the scope of the embodiments, as defined by the claims to follow.

What is claimed is:

1. A computer-implemented method comprising:
    determining a type of content of a website referenced by a hyperlink, the website comprising a set of images;
    identifying a set of indicators, wherein each indicator is associated with a corresponding image characteristic;
    determining, from the set of indicators, a subset of positive indicators and a subset of negative indicators based on the type of content of the website;
    determining a rank for each image from the set of images by utilizing the subset of positive indicators to increase the rank of each image comprising one or more positive indicators from the subset of positive indicators and utilizing the subset of negative indicators to decrease the rank of each image comprising one or more negative indicators from the subset of negative indicators;
    selecting, based on the rank of each image, at least one image from the set of images to include in a preview of the website;
    generating a preview of the website to include the selected at least one image; and
    providing the generated preview of the website for display by a client device.

2. The method of claim 1, wherein the rank of each image is indicative of a relationship between the image and the website referenced by the hyperlink.

3. The method of claim 1, wherein the type of content comprises at least one of an image gallery, a commercial news website, an amateur news website, or an online store.

4. The method of claim 1, wherein the set of indicators comprise of at least one of an image file name, an image file format, an image file size, or a set of image dimensions.

5. The method of claim 1, wherein utilizing the subset of positive indicators to increase the rank of each image comprising one or more positive indicators from the subset of positive indicators further comprises:
    for each image of the set of images, increasing the rank of the image in response to determining a positive correlation between one or more indicators from the image and the subset of positive indicators.

6. The method of claim 1, wherein utilizing the subset of negative indicators to decrease the rank of each image comprising one or more negative indicators from the subset of negative indicators further comprises:
    for each image of the set of images, decreasing the rank of the image in response to determining a positive correlation between one or more indicators from the image and the subset of negative indicators.

7. The method of claim 1, further comprising identifying a content producer referenced by the hyperlink and applying a set of preview image selection rules specified by the content producer to select the at least one image from the set of images to include in the preview of the website.

8. The method of claim 1, further comprising updating the set of images from the website from a previously acquired version of the set of images to an updated version of the set of images from the website.

9. The method of claim 1, further comprising publishing a post containing the generated preview including the selected at least one image in response to receiving an indication from the client device to publish the post.

10. A non-transitory computer-readable medium storing instructions for execution by a processor, the instructions to perform operations comprising:
    determining a type of content of a website referenced by a hyperlink, the website comprising a set of images;
    identifying a set of indicators, wherein each indicator is associated with a corresponding image characteristic;
    determining, from the set of indicators, a subset of positive indicators and a subset of negative indicators based on the type of content of the website;
    determining a rank for each image from the set of images by utilizing the subset of positive indicators to increase the rank of each image comprising one or more positive indicators from the subset of positive indicators and utilizing the subset of negative indicators to decrease the rank of each image comprising one or more negative indicators from the subset of negative indicators;
    selecting, based on the rank of each image, at least one image from the set of images to include in a preview of the website;

generating a preview of the website to include the selected at least one image; and providing the generated preview of the website for display by a client device.

11. The non-transitory computer-readable medium of claim 10, wherein the rank of each image is indicative of a relationship between the image and the website referenced by the hyperlink.

12. The non-transitory computer-readable medium of claim 10, wherein the type of content comprises at least one of an image gallery, a commercial news website, an amateur news website, or an online store.

13. The non-transitory computer-readable medium of claim 10, including instructions to perform further operations comprising:

for each image of the set of images, increasing the rank of the image in response to determining a positive correlation between one or more indicators from the image and the subset of positive indicators.

14. The non-transitory computer-readable medium of claim 10 including instructions to perform further operations comprising:

for each image of the set of images, decreasing the rank of the image in response to determining a positive correlation between one or more indicators from the image and the subset of negative indicators.

15. The non-transitory computer-readable medium of claim 10 including instructions to perform further operations comprising:

identifying a content producer referenced by the hyperlink and applying a set of preview image selection rules specified by the content producer to select the at least one image from the set of images to include in the preview of the website.

16. The non-transitory computer-readable medium of claim 10 including instructions to perform further operations comprising updating the set of images from the website from a previously acquired version of the set of images to an updated version of the set of images from the website.

17. The non-transitory computer-readable medium of claim 10 including instructions to perform further operations comprising:

publishing a post containing the generated preview including the selected at least one image in response to receiving an indication from the client device to publish the post.

18. A system comprising:

a processing system including at least one processor; and a non-transitory machine-readable medium including instructions which cause the processing system to perform operations comprising:

determining a type of content of a website referenced by a hyperlink, the website comprising a set of images;

identifying a set of indicators, wherein each indicator is associated with a corresponding image characteristic;

determining, from the set of indicators, a subset of positive indicators and a subset of negative indicators based on the type of content of the website;

determining a rank for each image from the set of images by utilizing the subset of positive indicators to increase the rank of each image comprising one or more positive indicators from the subset of positive indicators and utilizing the subset of negative indicators to decrease the rank of each image comprising one or more negative indicators from the subset of negative indicators;

selecting, based on the rank of each image, at least one image from the set of images to include in a preview of the website;

generating a preview of the website to include the selected at least one image; and providing the generated preview of the website for display by a client device.

19. The system of claim 18, wherein the rank of each image is indicative of a relationship between the image and the website referenced by the hyperlink.

20. The system of claim 18, wherein the non-transitory machine-readable medium includes instructions that cause the processing system to perform operations further comprising:

for each image of the set of images, increasing the rank of the image in response to determining a positive correlation between one or more indicators from the image and the subset of positive indicators.

* * * * *